(12) United States Patent
Soika et al.

(10) Patent No.: US 8,388,415 B2
(45) Date of Patent: Mar. 5, 2013

(54) POWER CUTTER

(75) Inventors: Martin Soika, Grosskrotzenburg (DE);
Stefan Sell, Mainz (DE); Horst Grossman, Huenfelden-Kirberg (DE)

(73) Assignee: Black & Decker Inc., Newark, DE (US)

( * ) Notice: Subject to any disclaimer, the term of this patent is extended or adjusted under 35 U.S.C. 154(b) by 1279 days.

(21) Appl. No.: 12/166,019

(22) Filed: Jul. 1, 2008

(65) Prior Publication Data
US 2009/0007440 A1    Jan. 8, 2009

(30) Foreign Application Priority Data
Jul. 4, 2007    (GB) .................................. 0712932.3

(51) Int. Cl.
*B24B 55/04* (2006.01)
(52) U.S. Cl. ..... 451/178; 451/358; 451/451; 125/13.01; 83/698.41; 30/388; 30/390
(58) Field of Classification Search .................. 451/178, 451/358, 451; 125/13.01; 83/698.41; 30/390, 30/388
See application file for complete search history.

(56) References Cited

U.S. PATENT DOCUMENTS

| | | | |
|---|---|---|---|
| 2,048,911 A | 7/1936 | Zimmerman | |
| 2,594,456 A | 4/1952 | Kroenlein | |
| 3,160,908 A | 12/1964 | Peabody et al. | |
| 3,797,064 A | 3/1974 | MacFarland | |
| 3,841,067 A | 10/1974 | Kato et al. | |
| 3,855,976 A | 12/1974 | Notaras et al. | |
| 3,893,240 A | 7/1975 | Morner et al. | |
| 3,898,414 A | 8/1975 | Hawley | |
| 3,938,971 A | 2/1976 | McClure | |
| 4,006,033 A | 2/1977 | Schewe | |
| 4,246,011 A | 1/1981 | Oberdorfer | |

(Continued)

FOREIGN PATENT DOCUMENTS

| DE | 37 08 756 | 9/1988 |
|---|---|---|
| DE | 4401186 A1 | 7/1994 |

(Continued)

OTHER PUBLICATIONS

Van Zoest, Peter—European Search Report on corresponding application No. EP08159684—Jun. 13, 2012—The Hague.

*Primary Examiner* — Eileen P. Morgan
(74) *Attorney, Agent, or Firm* — Harness, Dickey & Pierce, P.L.C.

(57) ABSTRACT

A power cutter comprising: a housing 2; an engine 24 mounted within the housing 2; a support arm 7 mounted on the housing and which projects forward of the housing; a blade mounting mechanism 70,90, 86, 92 rotatably mounted on the end of the support arm and which is capable of being rotationally driven by the engine 24 when the engine is running; a liquid fuel aeration mechanism 126 to generate aerated fuel for the engine; an air intake 314 for the provision of air for the liquid fuel aeration device 126; an air filtration mechanism 316 to filter the air drawn in from the air intake for the liquid fuel aeration mechanism; a fuel tank 124 for providing fuel to the liquid fuel aeration mechanism; and an exhaust 146 through which the exhaust gases generated by the operation of the engine are expelled; wherein the air filtration mechanism comprises an air filter 320 comprising a plurality of pleats which hang substantially vertically downwardly when the power cutter is in its standard orientation.

24 Claims, 23 Drawing Sheets

U.S. PATENT DOCUMENTS

| | | | |
|---|---|---|---|
| 4,345,353 | A | 8/1982 | Sommerfeld |
| 4,370,153 | A | 1/1983 | Russell et al. |
| 4,443,235 | A | 4/1984 | Brenholt et al. |
| 4,661,129 | A * | 4/1987 | Nederman ............ 96/408 |
| 4,783,207 | A | 11/1988 | Nagashima et al. |
| 4,861,359 | A | 8/1989 | Tettman |
| 4,932,490 | A | 6/1990 | Dewey |
| 5,168,837 | A | 12/1992 | Scholz |
| 5,194,077 | A | 3/1993 | Bargiel et al. |
| 5,233,945 | A | 8/1993 | Wolf et al. |
| 5,271,751 | A | 12/1993 | Lägler |
| 5,317,997 | A | 6/1994 | Tomitaku |
| 5,342,433 | A | 8/1994 | Avondoglio |
| 5,367,988 | A | 11/1994 | Collins |
| 5,377,632 | A | 1/1995 | Aronsson et al. |
| D355,482 | S | 2/1995 | Grigsby, Jr. |
| 5,438,965 | A | 8/1995 | Aronsson et al. |
| 5,522,355 | A | 6/1996 | Uhl |
| 5,556,441 | A | 9/1996 | Courtwright et al. |
| 5,570,751 | A | 11/1996 | Courtwright et al. |
| 5,595,153 | A | 1/1997 | Höppner et al. |
| 5,704,956 | A | 1/1998 | Loveless et al. |
| 5,711,775 | A * | 1/1998 | Field et al. ............ 96/426 |
| 5,813,384 | A | 9/1998 | Lavender et al. |
| 5,829,094 | A | 11/1998 | Field et al. |
| 5,924,208 | A | 7/1999 | Saeki |
| 6,027,553 | A * | 2/2000 | Hirano et al. ............ 95/283 |
| 6,117,200 | A | 9/2000 | Berg et al. |
| 6,155,246 | A | 12/2000 | Yanami et al. |
| 6,263,850 | B1 | 7/2001 | Winmill et al. |
| 6,295,953 | B1 * | 10/2001 | Ohsawa et al. ............ 123/41.7 |
| 6,391,073 | B1 | 5/2002 | Koga |
| 6,561,287 | B2 | 5/2003 | DeBlasio |
| 6,598,263 | B2 | 7/2003 | Boles et al. |
| 6,638,329 | B2 | 10/2003 | Gerold |
| 6,640,443 | B2 | 11/2003 | Hüsges et al. |
| 6,752,846 | B2 | 6/2004 | Rotter et al. |
| 6,863,044 | B2 | 3/2005 | Nakamura et al. |
| 6,994,070 | B2 | 2/2006 | Taomo et al. |
| 6,995,698 | B2 | 2/2006 | Suh et al. |
| 7,152,276 | B2 | 12/2006 | Jin et al. |
| 7,186,281 | B2 | 3/2007 | Cheng |
| 7,311,067 | B2 | 12/2007 | Riehmann |
| 7,494,520 | B2 | 2/2009 | Nam et al. |
| 7,544,223 | B2 | 6/2009 | Oda et al. |
| 2006/0260281 | A1 | 11/2006 | Peng |
| 2006/0283158 | A1 | 12/2006 | Kennedy |
| 2007/0079589 | A1 | 4/2007 | Ekstrom et al. |
| 2007/0199554 | A1 | 8/2007 | Jakobsson |
| 2007/0289273 | A1 * | 12/2007 | Boyd ............ 55/497 |

FOREIGN PATENT DOCUMENTS

| | | |
|---|---|---|
| DE | 20 2004 013 873 | 12/2004 |
| EP | 1 290 971 | 3/2003 |
| GB | 624328 | 6/1949 |
| GB | 2420727 A | 6/2006 |
| JP | 54-107160 | 8/1979 |
| JP | 57144017 | 9/1982 |
| JP | 59-4411 | 11/1984 |
| JP | 63-158113 | 7/1988 |
| JP | 2-280810 | 11/1990 |
| JP | 53-31264 | 12/1993 |
| WO | 2005/056225 A1 | 6/2005 |
| WO | WO 2007/141712 | 12/2007 |

* cited by examiner

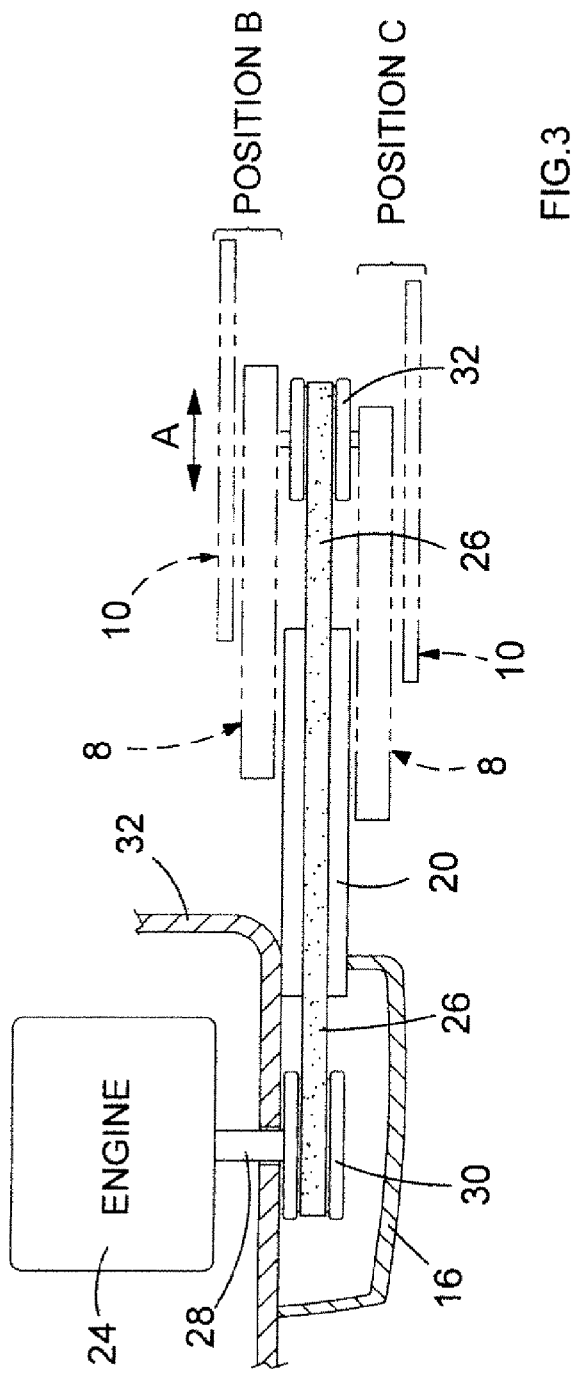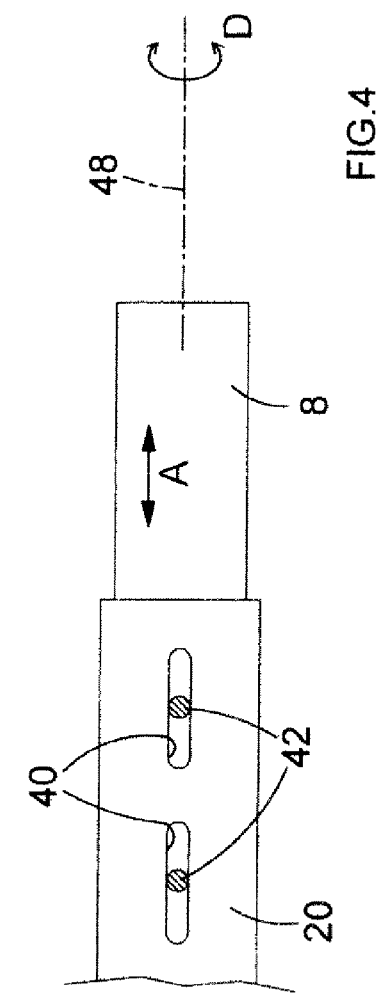

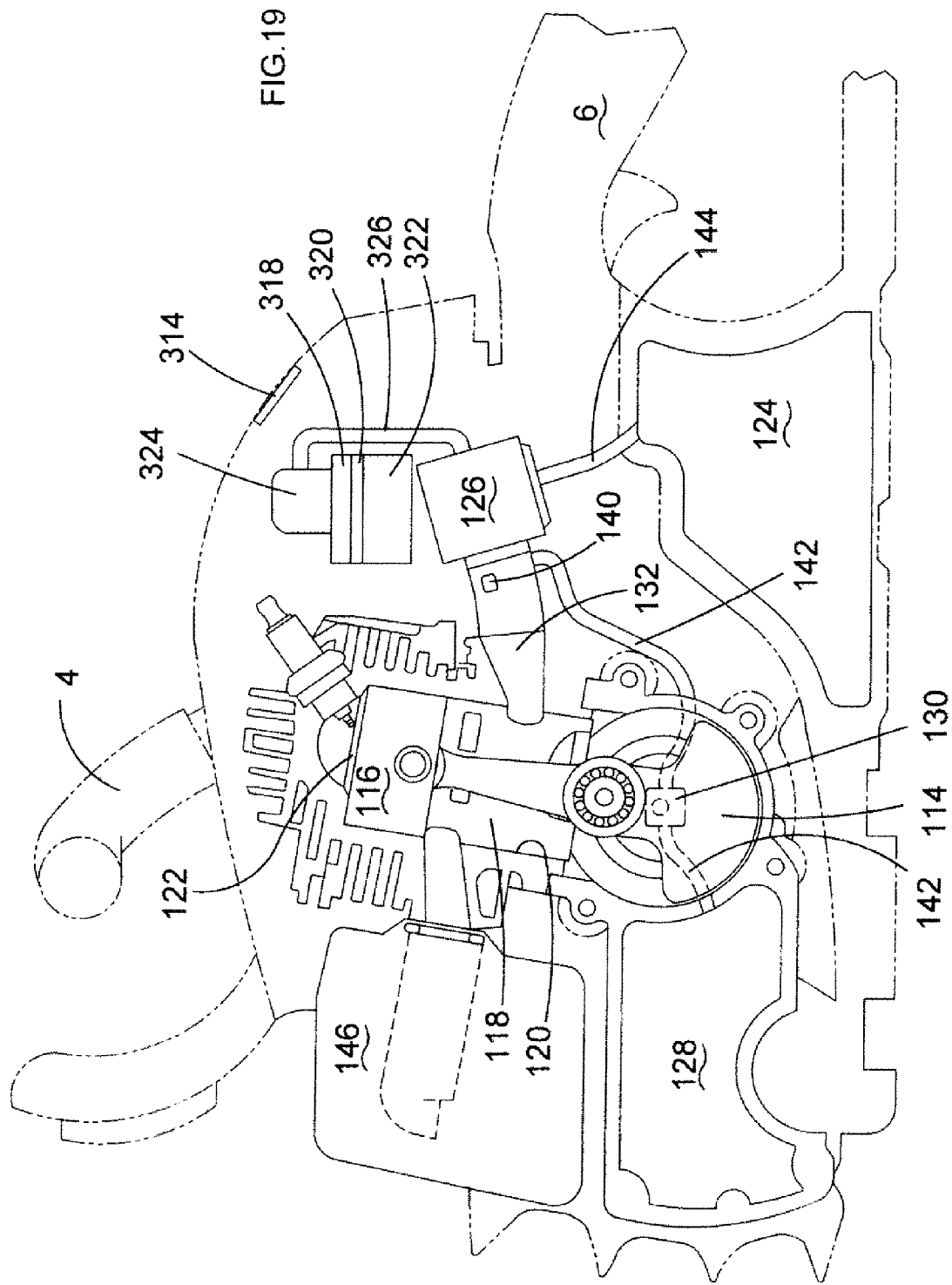

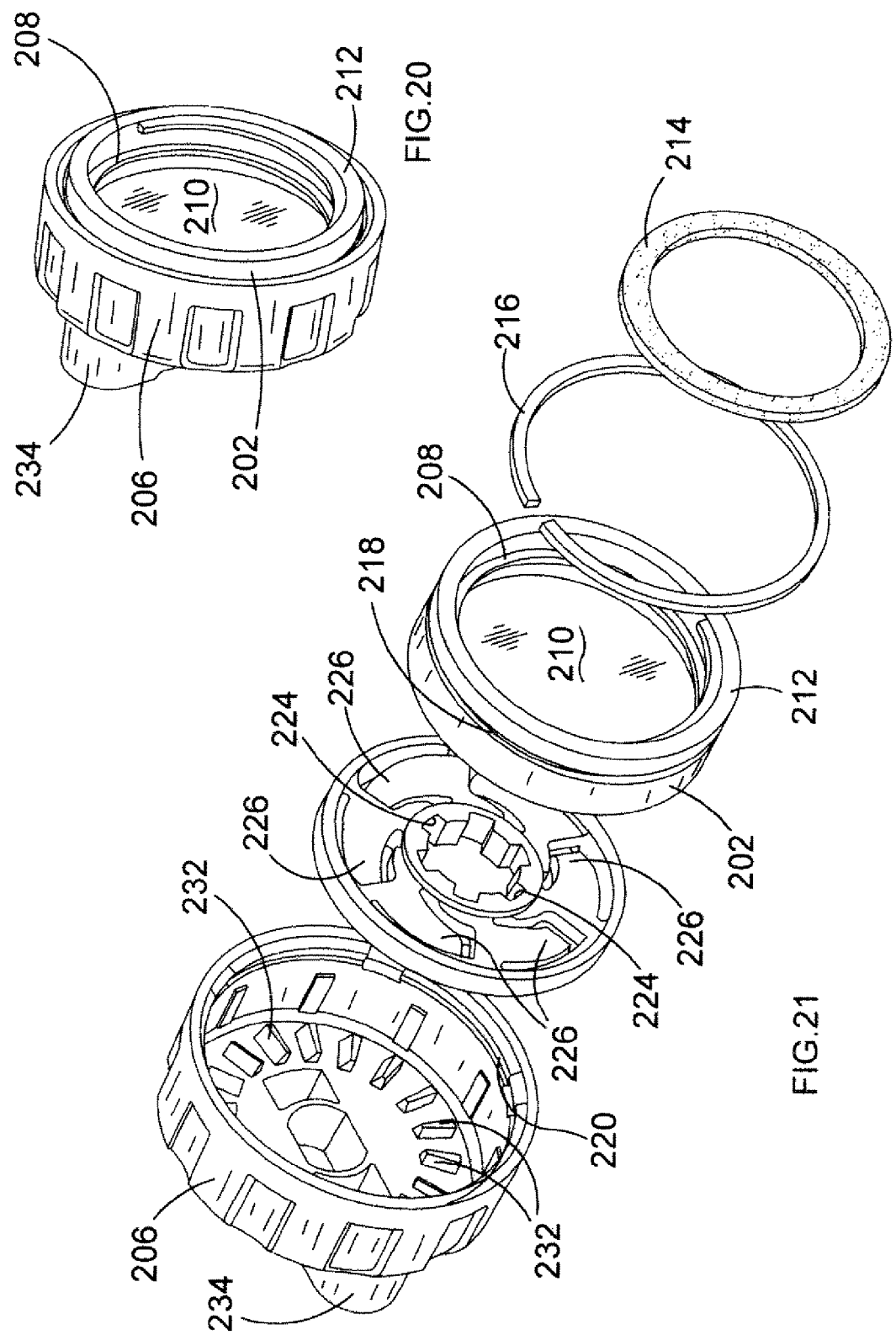

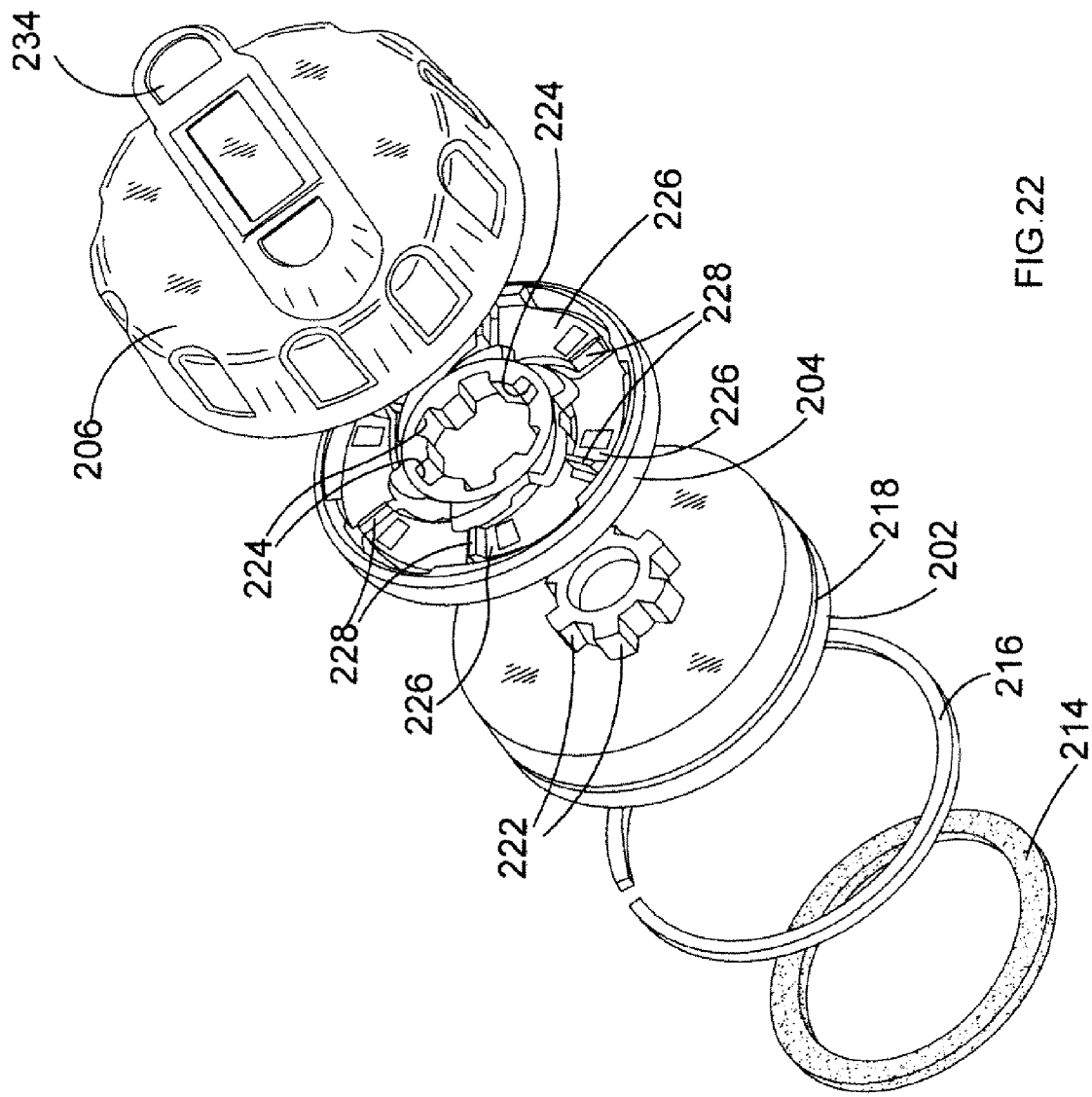

POWER CUTTER

This application claims the benefit and priority of GB 07 129 32.3, filed Jul. 4, 2007. The entire disclosure of the above application is incorporated herein by reference.

FIELD OF THE INVENTION

The present invention relates to a power cutter.

BACKGROUND OF THE INVENTION

A typical power cutter comprises a housing in which is mounted a two stroke internal combustion engine. Attached to the side of the housing is a support arm which extends forward of the housing. Rotatably mounted on the end of the support arm is a cutting blade, usually in the form of a grinding disk. The motor is drivingly connected to the cutting blade via a drive belt. The rotary output of the engine rotatingly drives the cutting blade via the drive belt. The drive belt is driven via a centrifugal clutch which enables the out drive spindle of the engine to disengage from the belt when the engine is running at a slow speed, to allow the engine to continue running, whilst disengaging any drive to the cutting blade to allow the blade to be stationary.

Also mounted in the housing is a petrol tank which provides petrol for the engine and an oil tank, which provides lubricating oil to mix with the petrol, to lubricate the engine, to provide a petrol/oil mixture. The petrol and oil mixture is fed into the engine via a carburetor, also mounted within the housing, which creates an aerated petrol/oil mixture, to power the engine.

Mounted on the rear of the housing is a rear handle for supporting the power cutter, which contains a trigger switch for accelerating the engine upon depressing. Depression of the trigger switch causes more of the aerated petrol/oil mixture to be injected into the engine from the carburetor which in turn causes the speed of the engine to accelerate.

GB2232913, WO2005/056225 and U.S. Pat. No. 5,177,871 show such power cutters.

BRIEF SUMMARY OF THE INVENTION

One problem associated with power cutters is the amount of dust generated during the operation of the power cutter and which surrounds the power cutter. The carburetor of the power cutter requires a clean air supply which is to be mixed with the petrol/oil mixture prior to being injected into the engine. It is important that the air is clean as dust laden air would block up the carburetor and damage the engine. As such, as with any internal combustion engine, the air entering the carburetor needs to be filtered. However, the carburetor is only able to draw air from the immediate vicinity of the power cutter, which is laden with the large amounts of dust generated by the action of the power cutter. Further more, such dust is typically very fine and as such is difficult to filter. This has resulted in the requirement for effective filter mechanisms to be used to clean air for the carburetor of power cutters. Simple filters soon block up due to the volume of dust generated. Such filters are often difficult to clean, usually due to their construction and the fineness of the dust. Alternatively, complicated filter mechanisms, often using centrifugal filter techniques, are used.

The present invention is intended to provide a simple construction of filter which is easy to clean.

Accordingly, there is provided a power cutter comprising:
a housing;
an engine mounted within the housing;
a support arm mounted on the housing and which projects forward of the housing;
a blade mounting mechanism rotatably mounted on the end of the support arm and which is capable of being rotationally driven by the engine when the engine is running;
a liquid fuel aeration mechanism to generate aerated fuel for the engine;
an air intake for the provision of air for the liquid fuel aeration device;
an air filtration mechanism to filter the air drawn in from the air intake for the liquid fuel aeration mechanism;
a fuel tank for providing fuel to the liquid fuel aeration mechanism; and
an exhaust through which the exhaust gases generated by the operation of the engine are expelled;
wherein the air filtration mechanism comprises an air filter comprising a plurality of pleats which hang substantially vertically downwardly when the power cutter is in its standard orientation.

The engine can be any type of internal combustion engine such as a four stroke, rotary or wankel engine, though typically they are two stroke engines. Furthermore, such an engine can run on a range of different types of fuel such as diesel, petrol or alcohol.

BRIEF DESCRIPTION OF THE DRAWINGS

Two embodiments of the invention will now be described with reference to accompanying drawings of which:

FIG. 3 shows a sketch of a horizontal cross section of the belt drive and support arm;

FIG. 4 shows a sketch of the forward and rearward sections of the support arm;

FIG. 19 shows a sketch of the vertical cross section of the body of a power cutter when the power cutter is in its standard orientation;

FIG. 20 shows a perspective view of the fuel cap;

FIG. 21 shows an exploded view of the fuel cap from a first side;

FIG. 22 shows an exploded view from a second side;

DETAILED DESCRIPTION OF THE INVENTION

Figure 1:
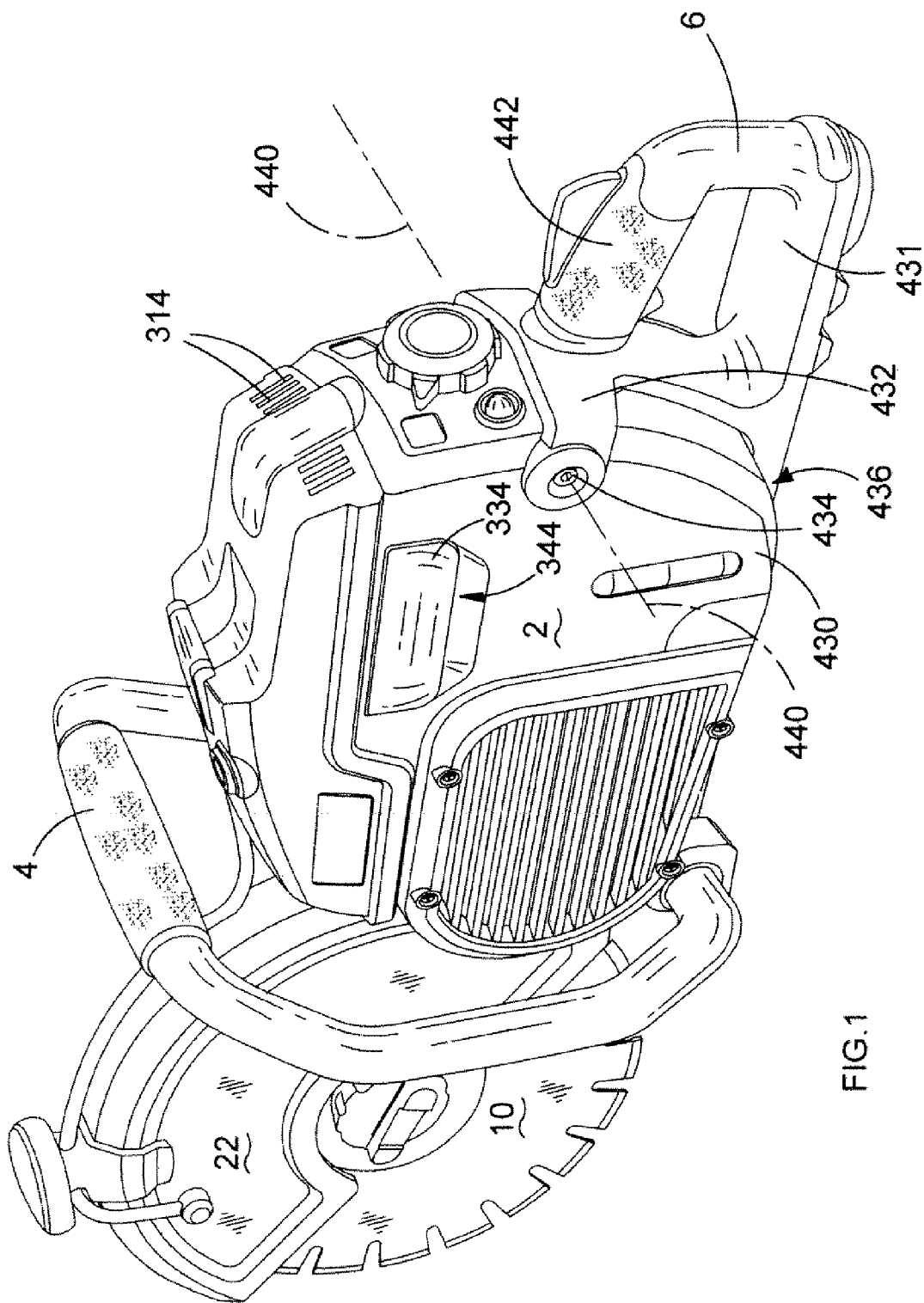
FIG. 1 shows a perspective view of the power cutter from a first side.
Figure 2:
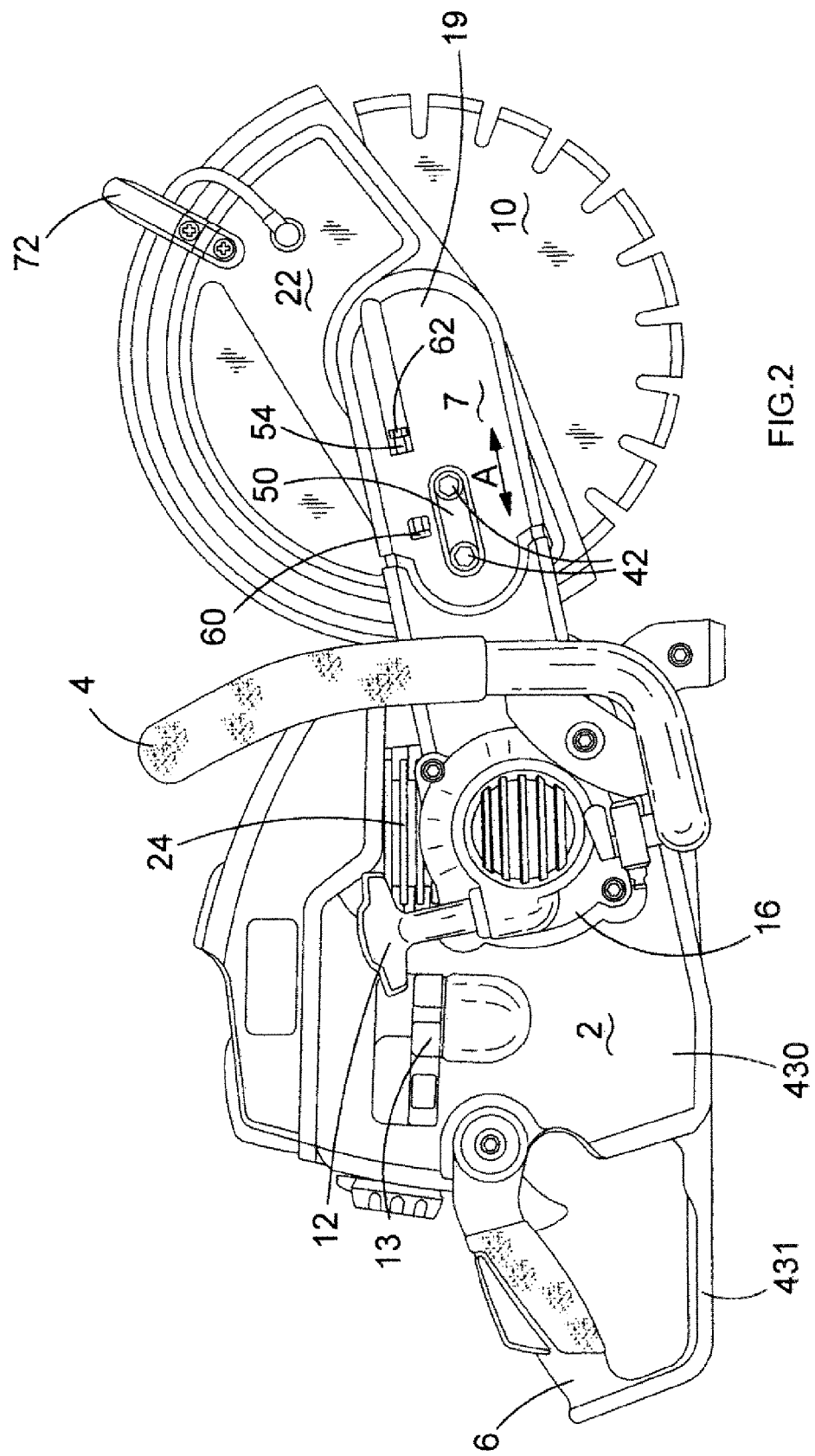
FIG. 2 shows a side view of the power cutter from a second side.

Referring to FIGS. 1 and 2, the power cutter comprises a body 2 in which is mounted a two stroke internal combustion engine 24, a front handle 4, a rear handle 6, a support arm 7, a cutting blade 10, rotatably mounted on the support arm 7 and driven by the engine 24 via a rubber belt 26 and a blade guard 22. A starter 12 is provided to activate the engine 24. A plastic cover 19 covers the out side of the support arm 7 as shown in FIG. 2. The power cutter is its standard orientation when it is located on a horizontal surface as shown in FIG. 1.

Referring to FIG. 3, the support arm 7 comprises two sections, a forward section 8 and a rearward section 20. The rearward section 20 is made from cast iron and is rigidly attached to the side of the gear housing 32 using bolts (not shown). The forward section 8 is made of cast iron and is slideably mounted on the rearward section 20. The forward section can slide in the direction of Arrow A. The method by which the forward section 8 is slideably mounted on the rearward section 20 is described in more detail below.

The engine 24 has an output shaft 28 on which is mounted a drive wheel 30 for the rubber belt 26. The output shaft drives the drive wheel 30 via a centrifugal clutch (not shown) in well known manner. A driven wheel 32 is rotatably mounted on the end of the forward section 8 of the support arm. The driven wheel 32 is connected to the cutting blade 10 which is also mounted on the forward section 8 as described below. The belt 26 passes around the rearward section 20, between the two wheels 30, 32 to transmit the rotation of the engine to the cutting blade 10. The purpose of enabling the forward section 8 to slide in relation to the rearward section 20 is to enable the belt 26 to be tensioned as described below. A hub 16 covers the drive wheel 30.

The Interconnection between rearward and forward sections of the support arm 7 will now be described with reference to FIGS. 3, 4, 5 and 6.

Referring to FIGS. 3 and 4, the rearward section 20 comprises two elongate slots 40 formed through the width of the rearward section 20. The elongate slots 40 are aligned with each other, are of equal length and run lengthways along rearward section 20 of the support arm. Formed through the forward section 8 are two corresponding holes 46. The part of the forward section 8 with the holes 46 is located alongside of the part of the rear section 20 with the elongate slots 40 so that the holes 46 align with a corresponding slot 40. A bolt 42 passes through each hole 46 and corresponding slot 40. A nut 44 is screwed onto the bolt 42 to sandwich the rearward and forward sections together and hold them in place using friction. The slots 40 enable the bolts 42, and hence the forward section 8, to slide relative to the rearward section 20.

In order to slide the rearward section 20 relative to the forward section 8, the nuts 44 are slackened so that the two can move relative to each other. The forward section 8 is then slid (using the belt tensioner described below) to the desired position, and then the nuts 44 are tightened to sandwich the rearward section 20 to the forward section 8 to prevent movement between the two.

The forward and rearward interconnection mechanism is designed so that the forward section 8 can be located on either side of the rearward section 20 as shown in FIG. 2. In normal operation, the forward section 8 is located on the same side of the rearward section 20 as the engine 24. This is indicated as position B. In this position, the cutting blade 10 is located closer to the central axis of the power cutter. However, it is sometimes desirable to have the cutting blade located towards the edge of the body 2 to enable it to cut near to a wall. The forward section 8 can then be moved to the other side of the rearward section 20 and be rotated through 180 degrees about the longitudinal axis 48 of the forward section 8 as indicated by Arrow D to the position C. In both orientations, the driven wheel 32 locates in the same position so that it can be driven by the belt 26.

The belt tensioner will now be described with reference to FIGS. 4, 5 and 6

Figure 5:
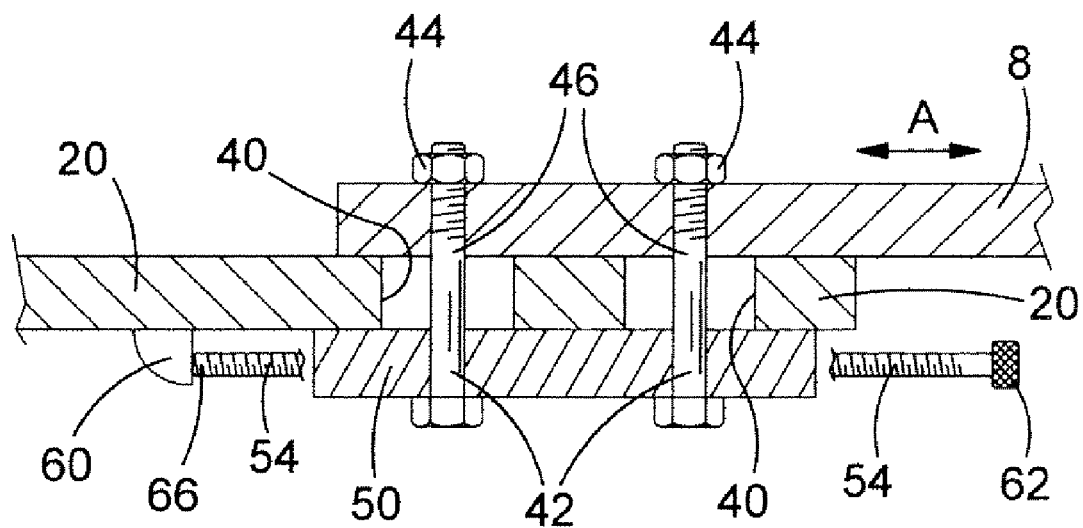
FIG. 5 shows a sketch of a horizontal cross sectional view of the connection between the rearward and forward sections of the support arm.
Figure 6:
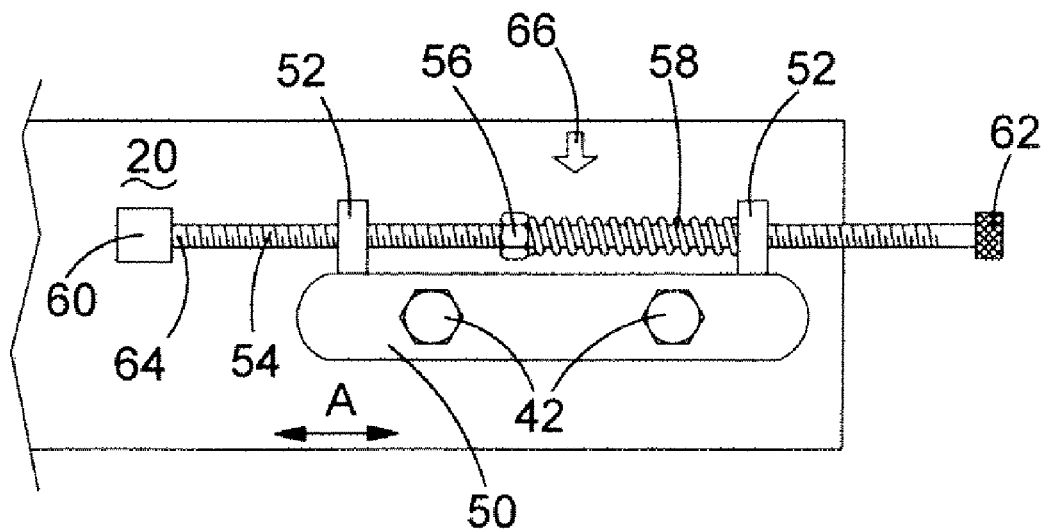
FIG. 6 shows the belt tensioner.

Referring to FIGS. 5 and 6, the belt tensioner comprises a metal plate 50 having two holes 46 through which the bolts 42 pass as seen in FIG. 4. The position of the plate 50 is fixed by the position of the bolts 42. Formed on the metal plate 50 are two hoops 52 which form apertures which are aligned. The shaft of an elongate bolt 54 passes through the hoops 52. The elongate bolt 54 can freely rotate and axially slide within the hoops 52. Threadedly mounted onto the bolt 54 is a nut 56. A spring 58 is sandwiched between the nut 56 and one of the hoops 52. The spring 58 prevents the nut from rotating. Therefore, as the bolt 54 is rotated, the nut 56 travels along the length of the bolt 54 in a direction dependent on the direction of rotation of the bolt 54. The position of the nut 56 is fixed relative to the hoop 52 by the spring 58. A stop 60 is integrally formed on the rearward section 20 of the supporting arm.

In order to tension the belt 26, the elongate bolt is rotated so that the nut moves towards the head 62 of the bolt 54. As its position is fixed by the spring 58, the nut remains stationary relative to the hoop 52 causing the bolt 54 to axially move within the hoops 52 so that the end 64 of the bolt 54 approaches the stop 60. Upon engagement of the stop 60, the end 64 and hence the bolt 54, can not move further and therefore the nut begins to move. The movement of the nut causes the spring 58 and hence the hoop 52 to move towards the head 62 of the elongate bolt 54. This in turn results in the plate 50, the two bolts 42 and the forward section 8 to move with the nut 56, the bolts 42 sliding within the two slots 40. However, when the belt 26 becomes tight, the forward section 8, and hence the bolts 42 and plate 50 are prevented from moving further. However, if the elongate nut 54 is further rotated, the nut 56 will continue to travel along its length. Therefore, the spring 58 becomes compressed, applying a force onto the hoop, and hence plate 50, which in turn transfers it to the forward section 8. This tensions the belt 26. The more compression of the spring 58, the more force is applied to the belt 26. An indicator 66 is added to the plate 50 to show when the amount of the compression of the spring 58 is sufficient to apply the correct amount of force to the belt 26.

The blade mount on the forward section 8 will now be described.

Figure 7:
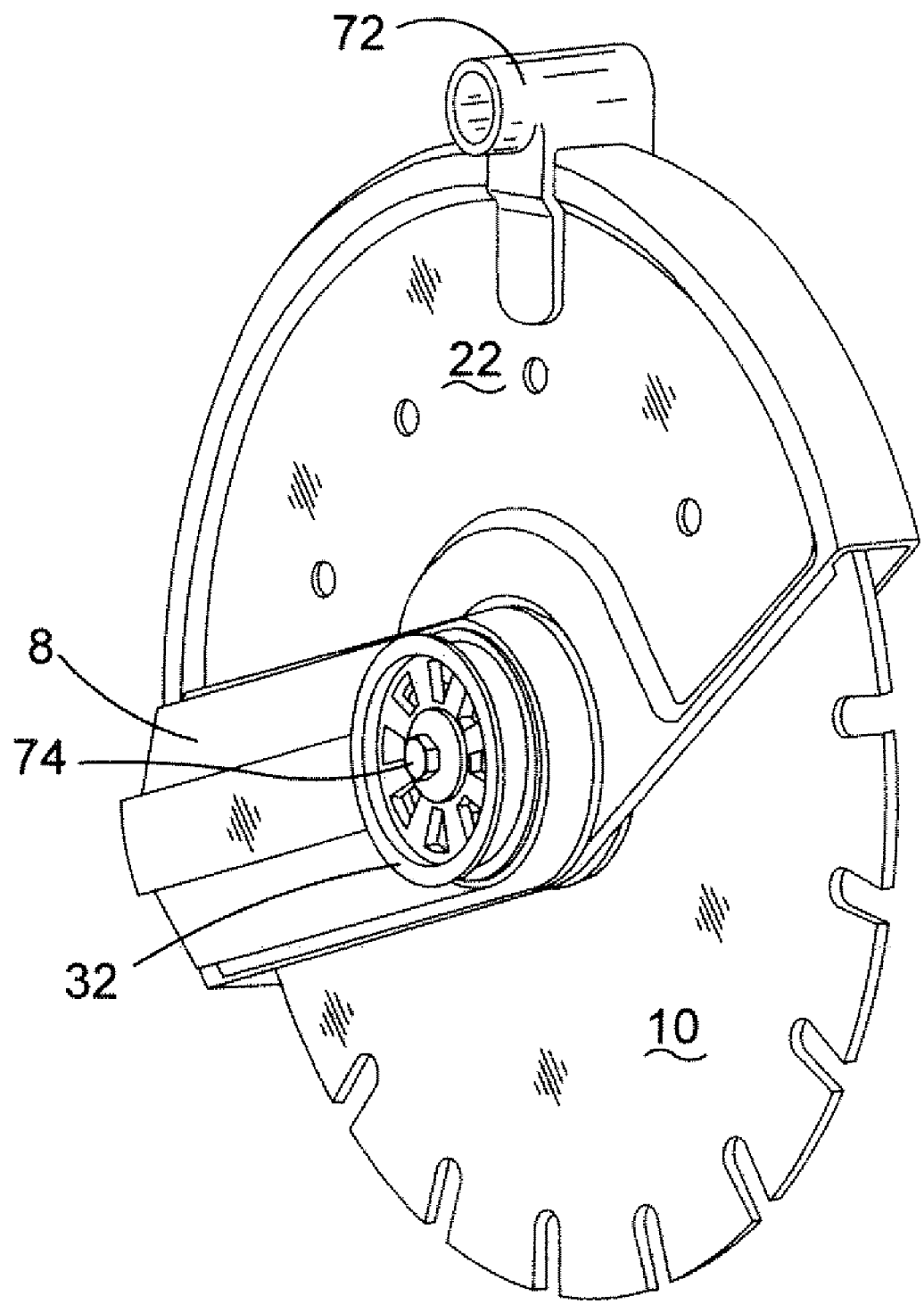
FIG. 7 shows a computerized drawing of the forward section, driven wheel, blade and blade guard.
Figure 8:
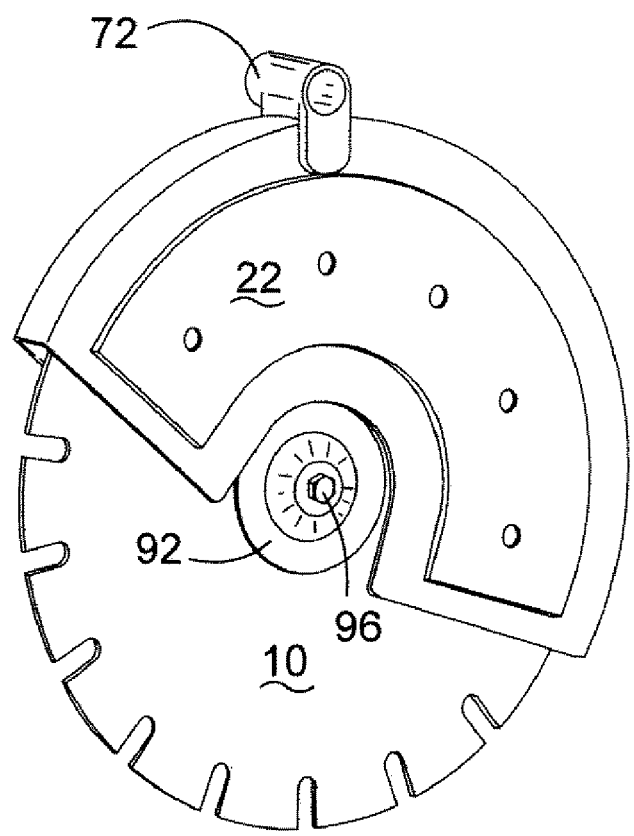
FIG. 8 shows a computerized drawing of the blade and blade guard from the opposite direction to that shown in FIG. 7.
Figure 9:
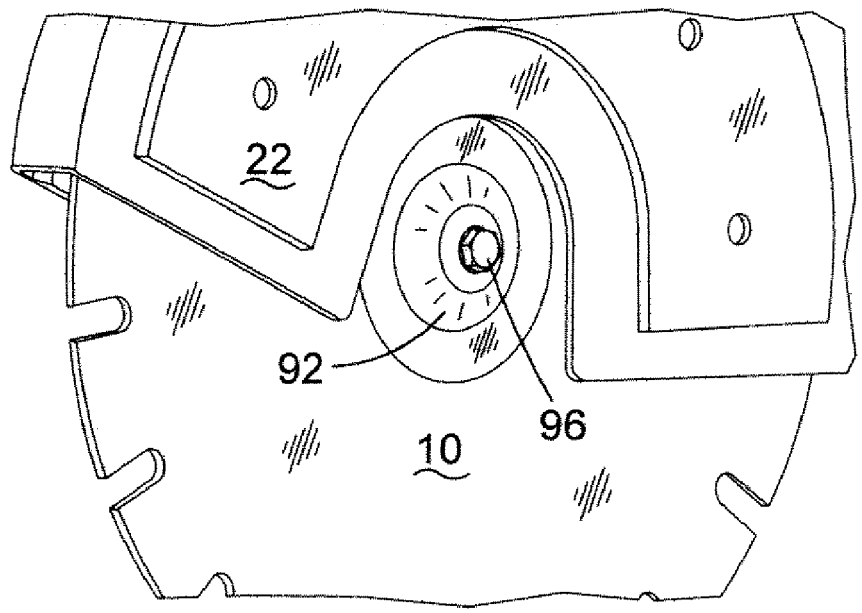
FIG. 9 shows a computerized drawing of a close up the blade and blade guard.

Referring to FIG. 7, the driven wheel 32 is rotatably mounted on the forward section 8. The driven wheel 32 is drivingly connected to the cutting blade 10 via a spindle 70 as will be described in more detail below. The blade guard 22 is pivotally mounted around the spindle 70 as will be described in more detail below. A grasp 72 is rigidly attached to the blade guard 22 which can held by an operator in order to pivot the blade guard 22.

FIGS. 12 to 18 show the mechanism by which the forward support 8 rotatably supports the cutting blade 10.

Figure 17:
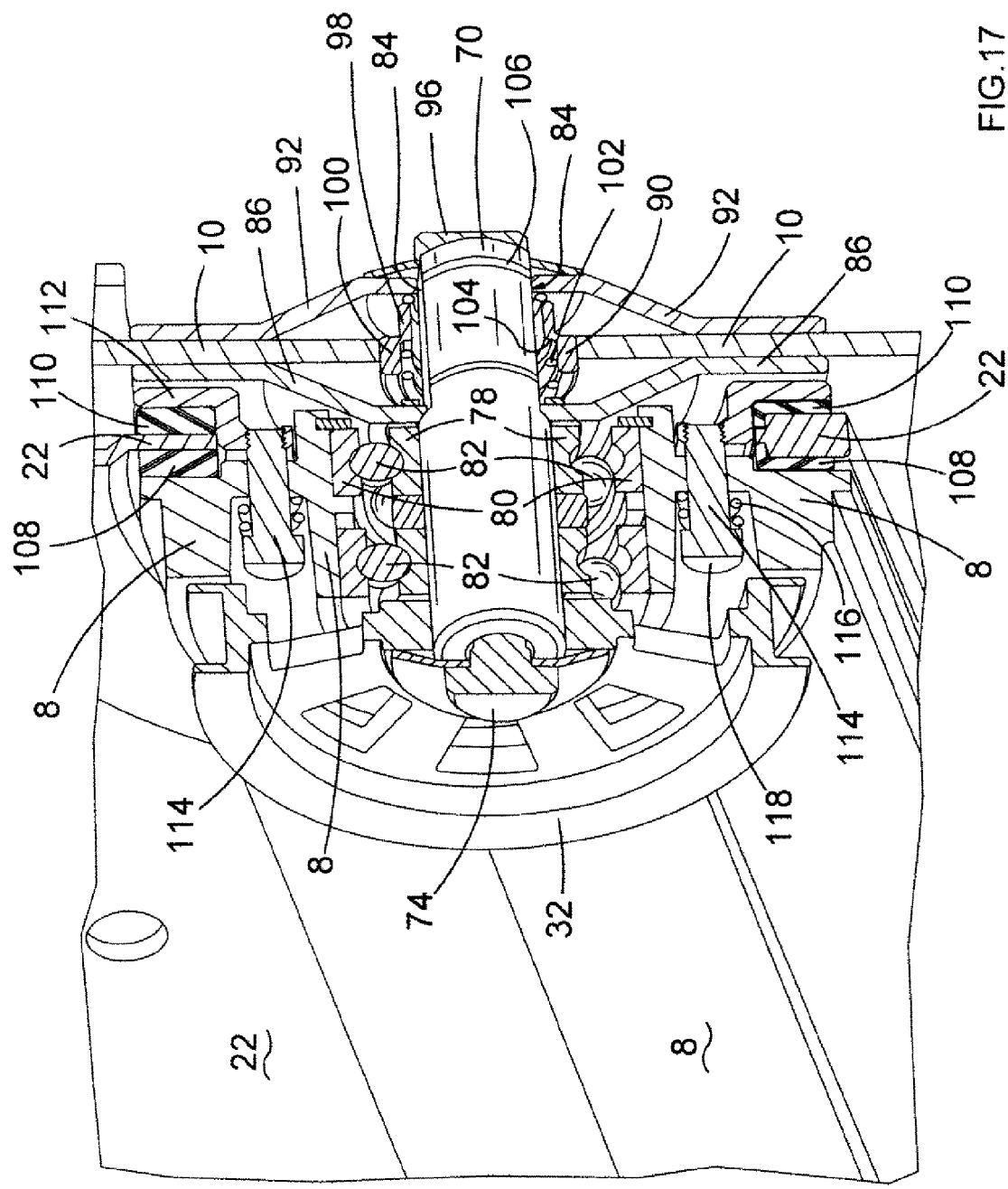
FIG. 17 shows a computerized drawing of a cut away view of the rotary support mechanism from a first perspective.
Figure 18:
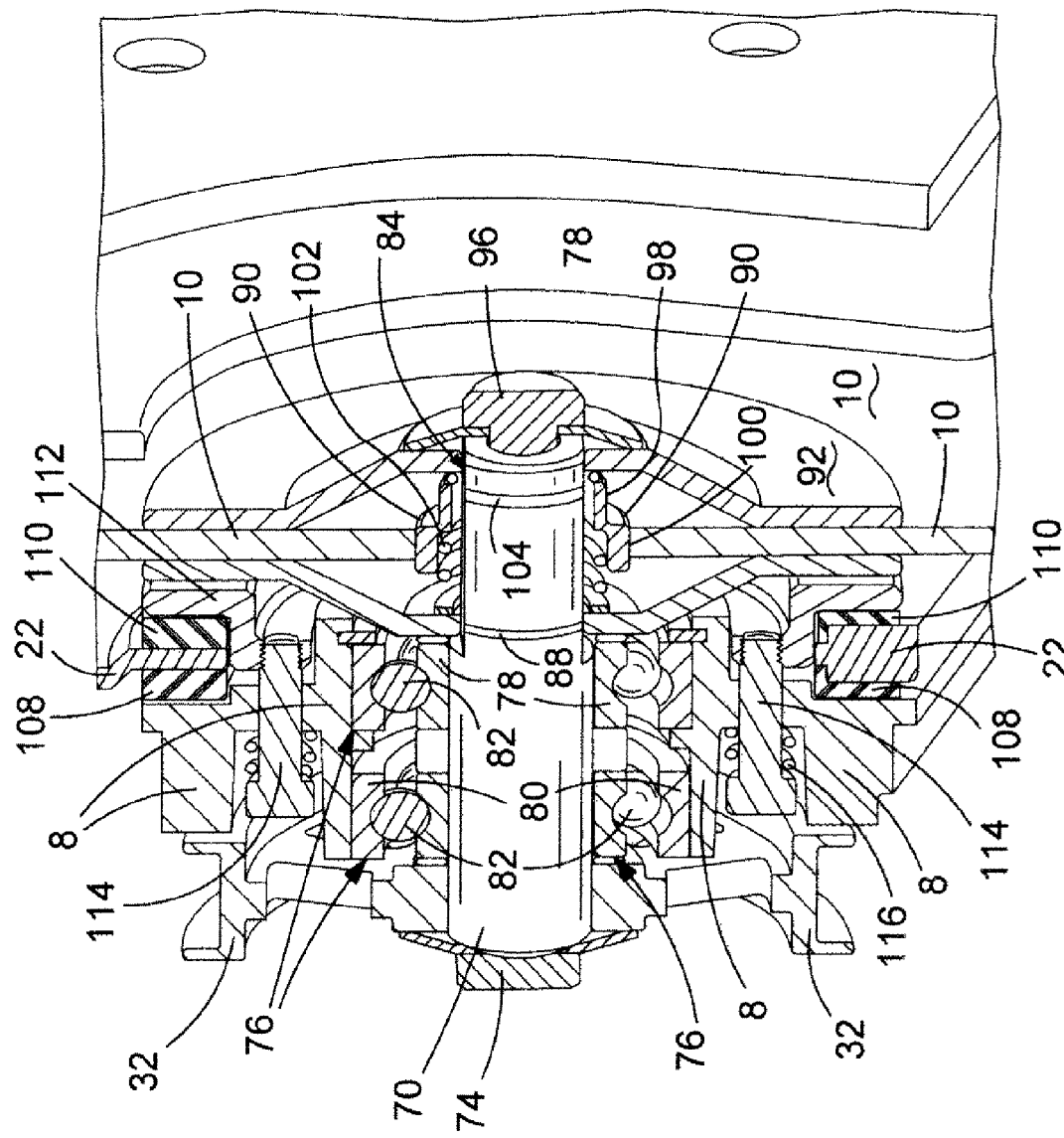
FIG. 18 shows a computerized drawing of a cut away view of the rotary support mechanism from a second perspective.
Figure 23:
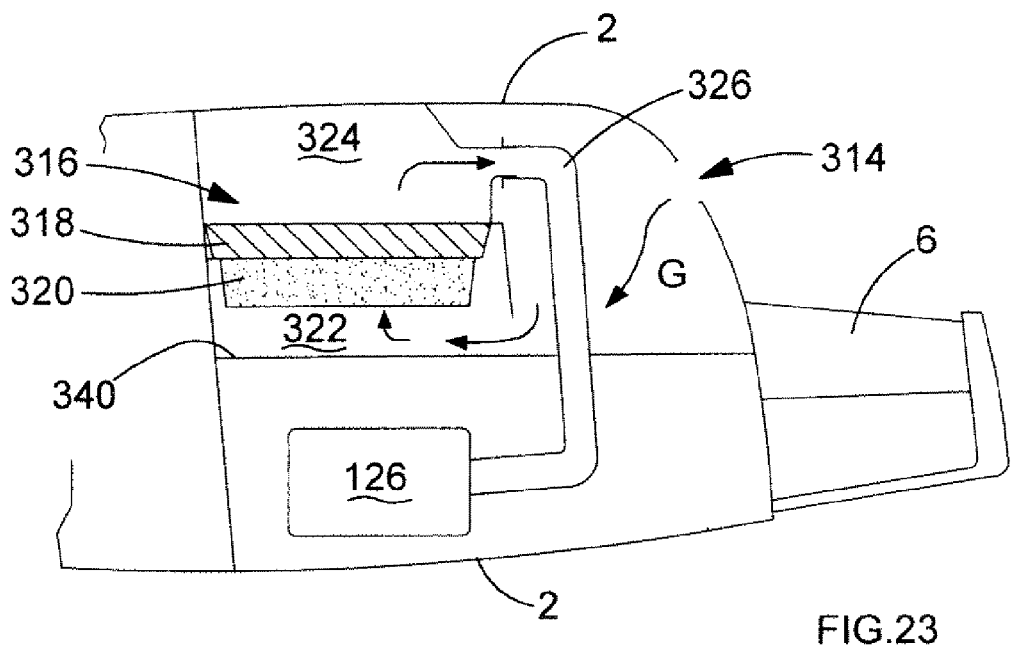
FIG. 23 shows a sketch of a vertical cross section of the part of the power cutter with the air filter when the power cutter is in its standard orientation.

Referring to FIGS. 17 and 18, the driven wheel 32 is rigidly attached to the spindle 70 via a flanged nut 74. Rotation of the driven wheel 32 results in rotation of the spindle 70. The spindle 70 is mounted in the forward section 8 using two ball bearing races 76, each comprising an inner track 78 rigidly connected to the spindle 70, an outer track 80 rigidly connected to the forward support 8, and a set of ball bearings 82 sandwiched between the two tracks 78, 80 which allow the outer track 80 to rotate relative to the inner track 78.

Figure 16:
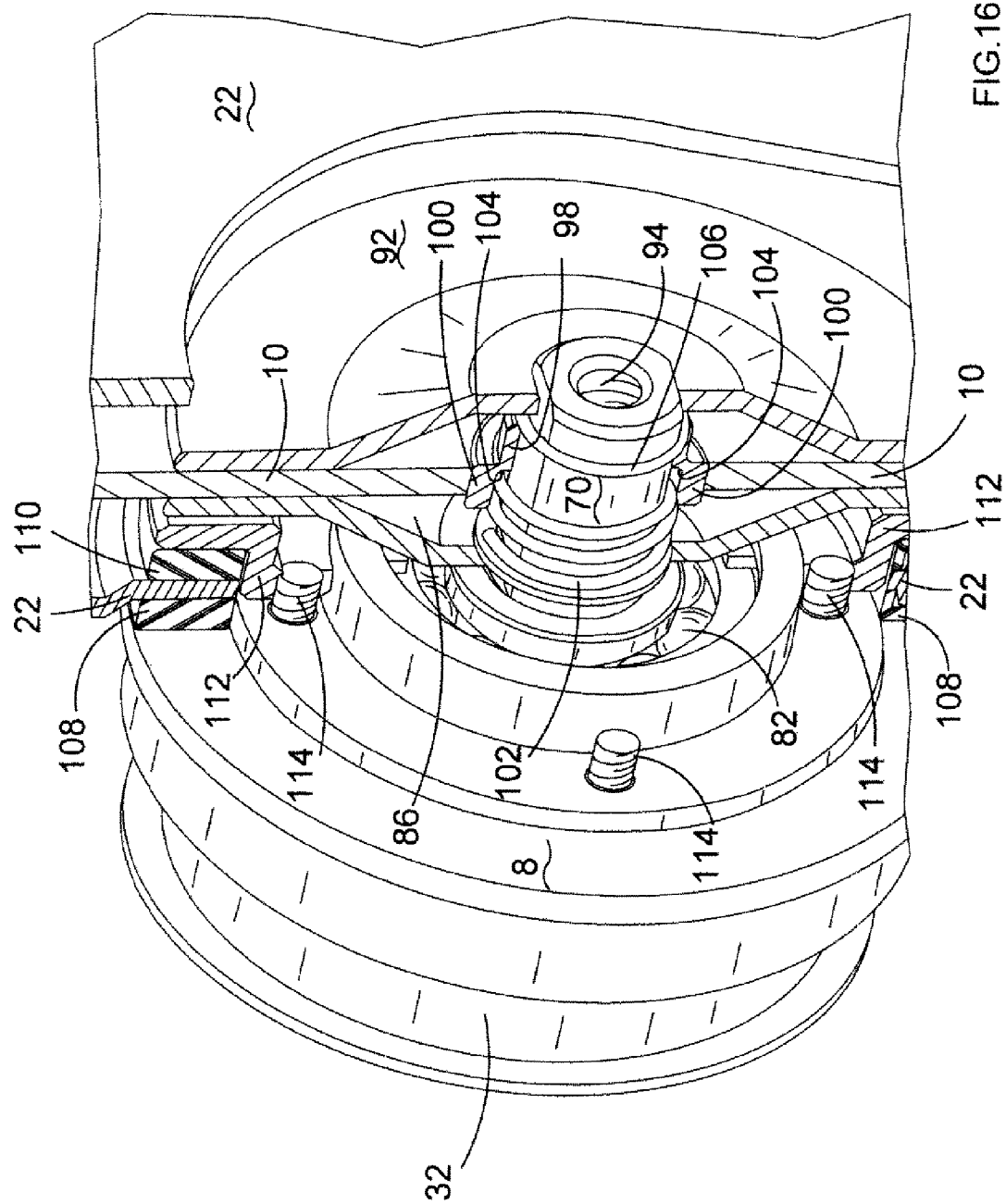
FIG. 16 shows a cut away view of the blade support.

Formed along a part of the length of the spindle 70 are two flat surfaces 84 (see FIG. 16). A second support disk 86 comprises a central hole which is predominantly circular with the same diameter of the spindle 70, but with two flat sides which correspond in dimensions to the flat surfaces 84 of the spindle 70. The second support disk 86 is mounted on the end of the spindle 70 and abuts against shoulders 88 on the spindle 70 formed by the two flat surfaces 84. The flat surfaces 84 ensure that the second support disk is rotationally fixed to the spindle 70 so that rotation of the spindle 70 results in rotation of the second support disk 86.

An adaptor 90 (described in more detail below) is mounted on the spindle 70. The adaptor can freely rotate about the spindle 70. The cutting blade 10 is mounted on the adaptor 90.

A first support disk 92 comprises a central hole which is predominantly circular with the same diameter of the spindle 70, but with two flat sides which correspond in dimensions to the flat surfaces 84 of the spindle 70. The first support disk 92 is mounted on the end of the spindle 70 and abuts against the cutting blade 10. The flat surfaces 84 ensure that the first support disk 92 is rotationally fixed to the spindle 70 so that rotation of the spindle 70 results in rotation of the first support disk 86.

Figure 10:
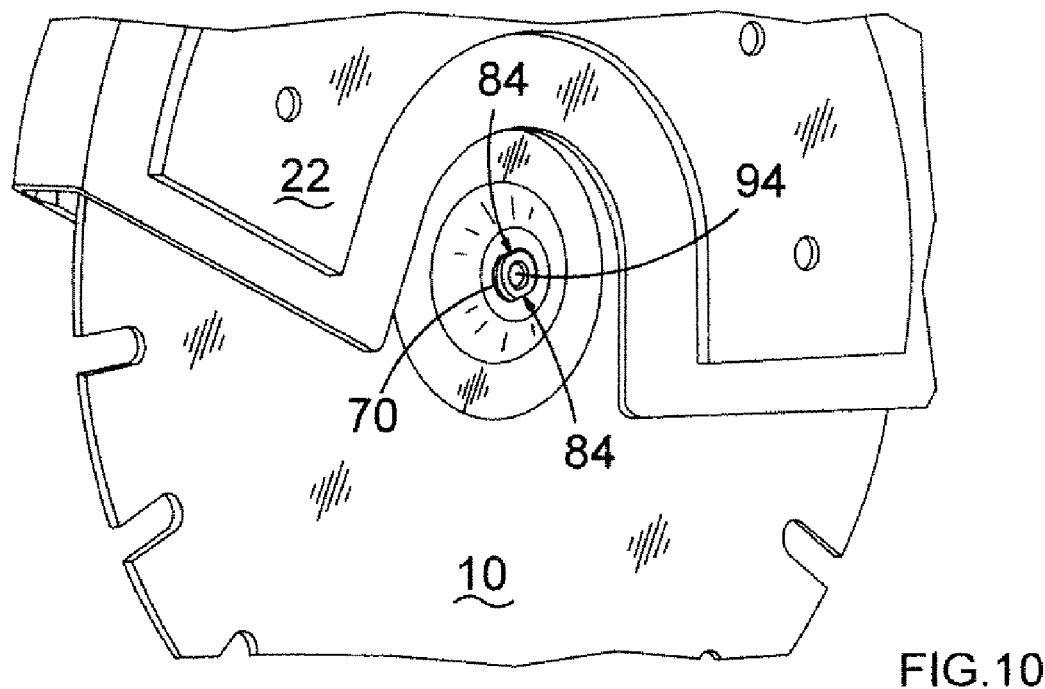
FIG. 10 shows a computerized drawing of a close up the blade and blade guard without the holding nut.
Figure 11:
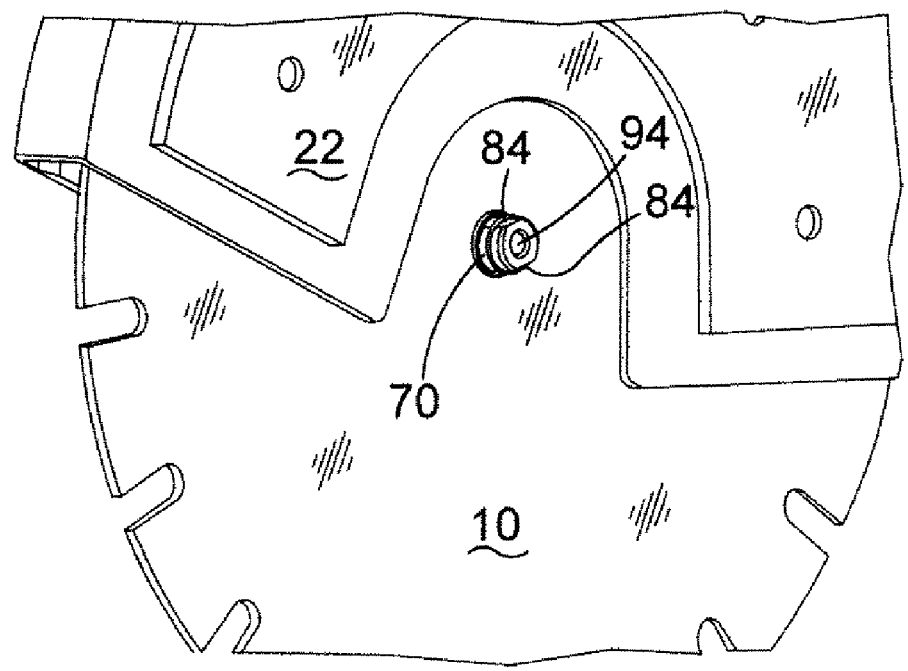
FIG. 11 shows a computerized drawing of a close up the blade and blade guard without the first support disk.
Figure 12:
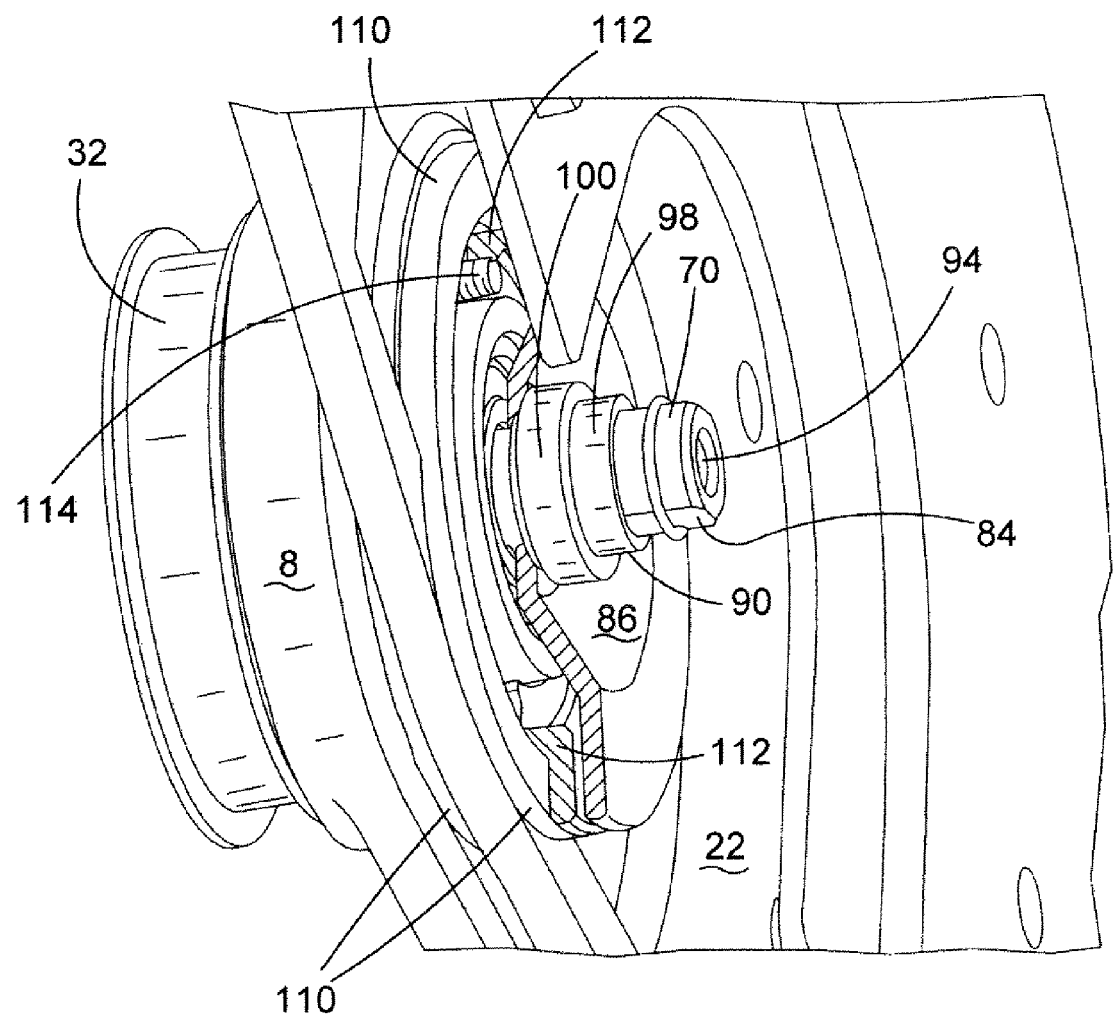
FIG. 12 shows a computerized drawing of forward support with the blade guard.

A threaded hole 94 is formed in the end of the spindle 70 (see FIGS. 10 to 12). A second flanged nut 96 is screwed into the hole 94. The flange of the nut 96 pushes the first support disk 92 against the blade 10 which in turn pushes the blade 10 against the second support disk 86. The blade 10 becomes sandwiched between the two support disks 86, 92. Rotation of the support disks 86, 92 by the spindle 70 results in rotation of the blade due to the frictional contact of the blade 10 being sandwiched between the two disks 86, 92. By frictionally driving the blade 10, it allows rotational movement of the blade 10 relative to the spindle 70 if the blade becomes snagged during the operation of the power cutter.

The automatic blade support adjustment mechanism will now be described.

Cutting blades of different sizes can be used. Different sized cutting blades 10 have different sized holes in their centres through which the spindle 70 passes. It is intended that the present power cutter will be able to fit cutting blades 10 having two different sizes of hole through their centres. This is achieved by the use of the adaptor 90.

Referring to FIGS. 17 and 18, the adaptor is mounted on the spindle 70 between the two support disks 86, 92. As well as being freely rotatable about the spindle 70, the adaptor 90 can axially slide along the spindle 70 between the disks 86, 92.

Figure 13:
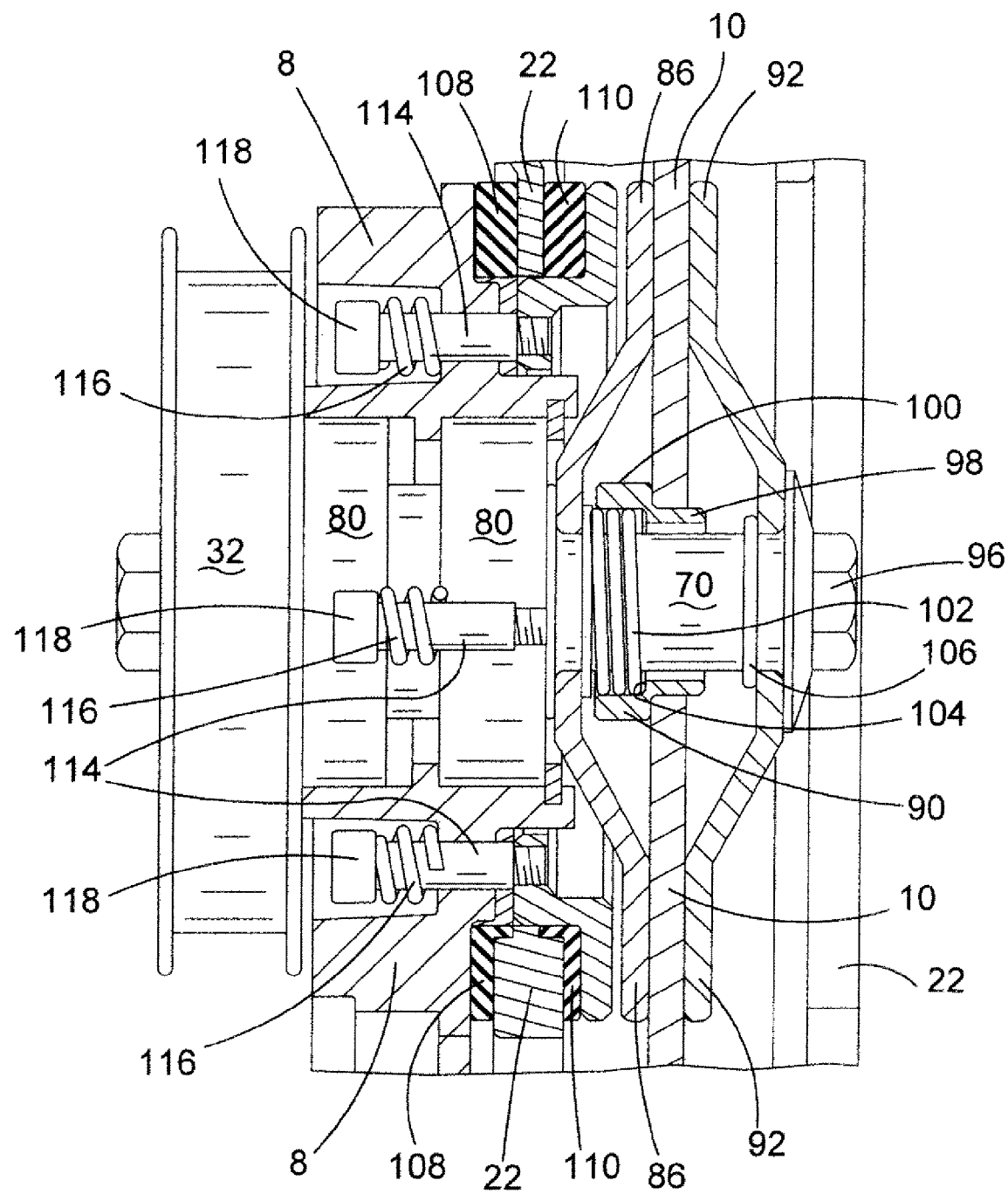
FIG. 13 shows a computerized drawing of a cut away view of the rotary support mechanism from the side with the adapter in the first position.
Figure 14:
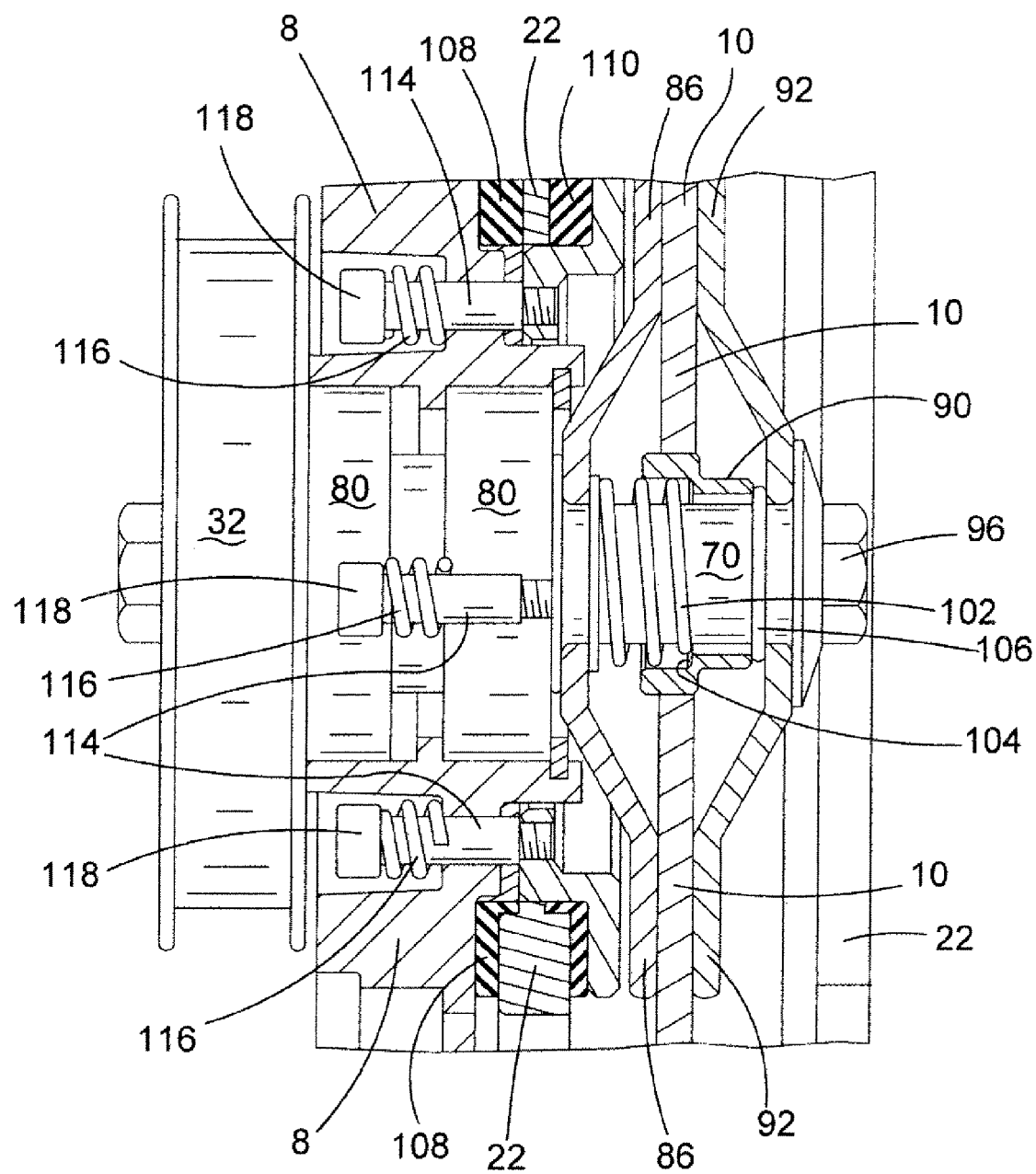
FIGS. 14 and 15 show computerized drawings of a cut away views of the rotary support mechanism from the side with the adapter in the second position.

The adaptor comprises a front section 98 and a rear section 100. The front section 98 has a first outer diameter, the rear section 100 has a second larger outer diameter. The two sections allow blades 10 with holes of different diameters to be mounted onto the spindle 70. In FIGS. 14 to 18, it can be seen that a blade 10 with a central hole of a first diameter is mounted on the rear section 100 of the adaptor 90. In FIG. 13, it can be seen that a blade 10 with a central hole of a second diameter is mounted on the front section 98 of the adaptor 90.

A spring 102 is sandwiched between the second support disk 86 and an inner shoulder 104 of the adaptor 90. The spring 102 biases the adaptor towards the first support disk 92. A circlip 106 is located around the spindle 70 which limits the maximum extent of axial travel of the adaptor 90. When the adaptor 90 is allowed to slide to its maximum extent and abut against the circlip 106, the rear section 100 is located centrally between the support disks 86, 92.

When a blade 10, having a centre hole with the same diameter of the rear section 100 of the adaptor is mounted onto the adapter, it fits onto the rear section 100 of the adaptor as shown in FIGS. 14 to 18. As such, the blade 10 is centrally located between the two support disks 86, 92. However, when a blade 10, having a centre hole with the same diameter of the front section 98 of the adaptor is mounted onto the adapter, it fits onto the front section 98 of the adaptor as shown in FIG. 13. It is prevented from sliding onto the rear section. In order for the blade 10 to be secured onto the spindle 70 by the support disks 86, 92, it must be located centrally between the two. When the first support disk 92 is mounted onto the spindle 70 after the blade, it pushes the blade 10 and adaptor 90 against the biasing force of the spring 102, moving the adaptor 90 towards the second support disk 86 as shown in FIG. 13. When the blade is securely mounted on the spindle 70, it is centrally located between the support disks. The front section is similarly mounted centrally. The adaptor enables two types of blade 10 to be used, it moving automatically in accordance with blade size.

The pivotal blade guard 22 will now be described.

Figure 15:
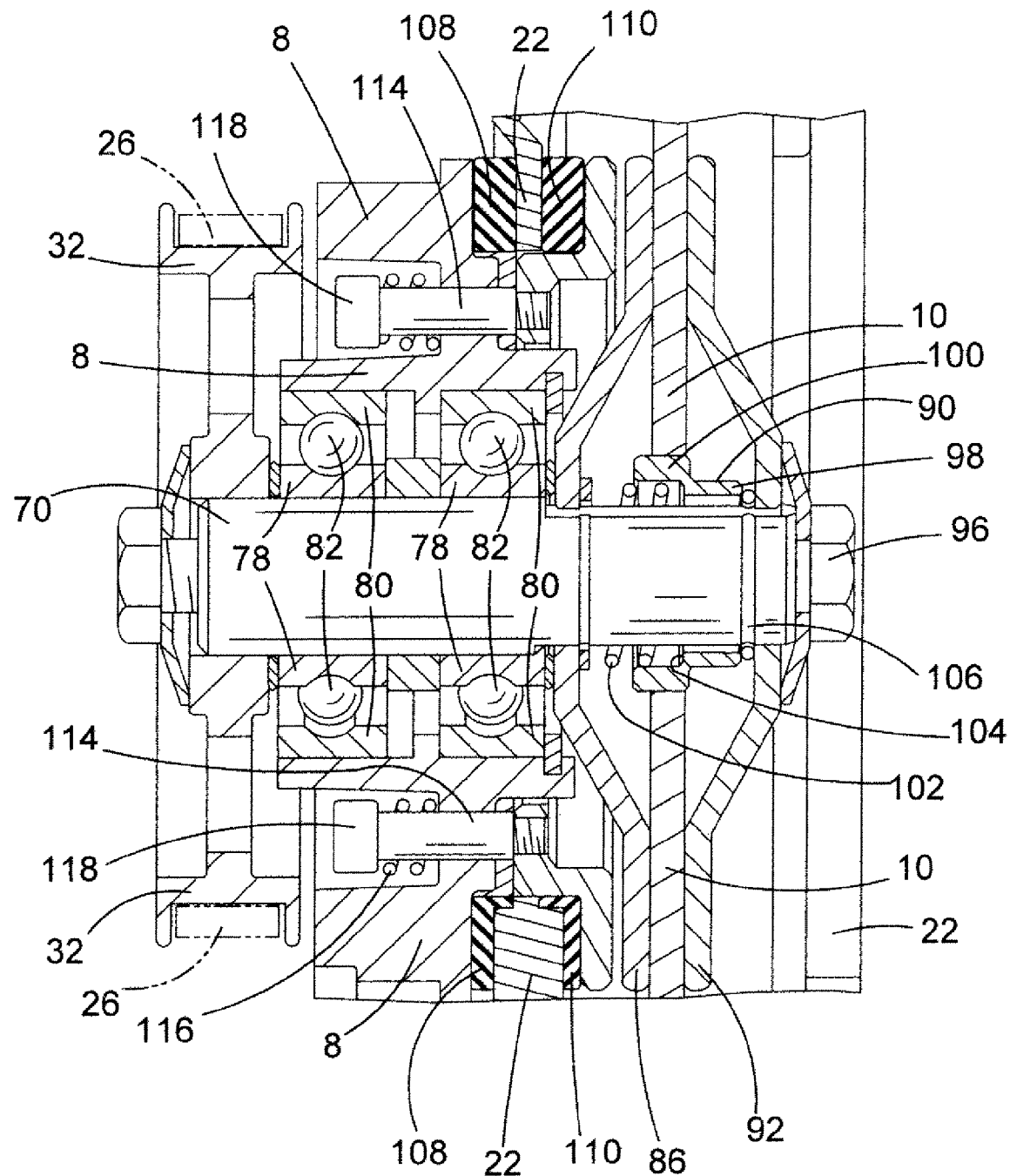

Referring to FIG. 15, the blade guard 22 is held by being sandwiched between two pieces of rubber 108, 110. The blade guard 22 can pivot about the spindle 70. However, it is frictionally held by the two pieces of rubber 108, 110. In order to pivot the guard 22, the operator must overcome the friction between the guard 22 and the rubber 108, 110.

A metal bracket 112 is attached to the forward section 8 via four bolts 114. The bolts pass freely through the forward section 8 and threadedly engage with threaded holes formed in the bracket 112. A helical spring 116 is sandwiched between the head 118 of each bolt 114 and the forward section 8, biasing the bolts 114 out of the holes, pulling the bracket 112 towards the forward section. Sandwiched between the bracket and the forward section 8 is a first piece of rubber, 108, the guard 22, a second piece of rubber 110 to form a rubber-guard-rubber sandwich. The strength of the spring 116 determines the amount of frictional force there is between the rubber 108, 110 and the guard.

In order to pivot the guard the operator holds the grasp 72 and pivots the guard 22 by over coming the frictional force between the guard and the rubber 108, 110.

The oil and petrol management system will now be described with reference to FIG. 19.

The internal combustion engine is fed with fuel from a carburetor 126. The engine burns the fuel in well known manner to generate rotary motion of its crank shaft 114, which connects to the output shaft 28. The exhaust gases are then expelled from the engine 24 through an exhaust 146 to the surrounding atmosphere.

The power cutter will comprise a petrol tank 124 in which is located petrol for driving the two stroke internal combustion engine 24. Petrol will pass from the tank 124 via passageway generally indicated by dashed lines 144 through the carburetor 126 which wilt mix it with air prior to being forwarded to the cylinder 118 where it will be burnt. Detail of the supply of air, including its filtration will be described in more detail below. A second tank 128 will also be mounted in the body 2 as shown in which lubricating oil will be contained. The oil will be pumped out of the tank 128 via an oil pump 130, which is mounted on the crank shaft housing which will be driven via a gear arrangement (not shown) from the crank shaft 114. The oil pump 130, will pump the oil from the oil tank 128 via the pump 130 into the passageway 132 between the carburetor 126 and the cylinder 120, through the passageways indicated by dashed lines 142, and then mixing the oil with the air/petrol mixture generated by the carburetor 126. It will inject oil at the ratio 1:50 in relation to the petrol. A sensor 140 will be mounted within the passageway 132 between the carburetor 126 and cylinder 120. The sensor will determine whether oil is being pumped correctly in to the passageway 132 either by checking the pressure of the oil as it enters the passageway 132 or by detecting the presence of oil in the passageway 132. The construction of such sensors are well known and therefore will not be described in any further detail. The engine will be controlled by an electronic ignition system. The sensor 140 will provide signals to the electronic ignition system about the oil being pumped into the passageway 132. In the event that insufficient or no oil is pumped into the passageway due to the fact that the oil tank is empty or there is a blockage in an oil pipe 142, the sensor 140 will send the signal to the ignition system. The ignition system will then either put the engine into an idle mode or switch the engine off entirely, depending on the settings of the ignition system. This will ensure that lubricating oil is always added to the petrol in the correct amount prior to combustion within the two stroke engine.

The construction of the fuel cap will now be described with reference to FIGS. 20 to 23.

The petrol tank 124 will be mounted within the body of the unit as generally indicated in FIG. 19. The tank 124 will be seated by a fuel cap 13 as shown on FIG. 2.

The fuel cap will comprise an inner cap 202, a clutch 204 and an outer cap 206. The inner cap is of a tubular construction with one end 210 being sealed. Formed on the inside surface of a side wall 212 is a thread 208. When the fuel cap is screwed onto the fuel tank, the thread 208 slidingly engages with a thread formed around the external surface of the neck of the fuel tank 124.

Located inside the inner cap 202 adjacent the end 210 is a seal 214. When the fuel cap is screwed onto the fuel tank, the seal 214 ensures that no fuel can escape from the tank. The inner cap 2 locates within the outer cap 206. Sandwiched between the two is the clutch 204. A clip 216 locates within a groove 218 of the inner cap and also engages with an inner groove 220 formed within the outer cap. The clip holds the inner cap inside the outer cap whilst allowing it to freely rotate within the outer cap 206. The inner cap comprises a number of teeth 222 integrally formed with the inner cap. The teeth locate within corresponding slots 224 formed within the clutch, thus rotation of the inner cap causes rotation of the clutch 204. Formed on the clutch 204 are a plurality of resilient arms 226 mounted on the ends of which are pegs 228. The pegs 228 face towards the internal end wall 230 of the outer cap. Formed on the wall are a plurality of ridges 232. The pegs on the clutch are arranged to co-operate with the ridges 232 in the outer cap.

Rotation of the outer cap 206 causes the ridges 232 to engage with the pegs 228 resulting in rotation of the clutch 204, which in turn rotates the inner cap 202 via the teeth 222. When the fuel cap is screwed onto the fuel tank, the inner cap 202 threadingly engages with the neck of the fuel tank, the rotation of the inner cap 202 being caused by rotation of the outer cap 6 via an operator rotating it using a finger grip 234. When the seal 214 located within the inner cap engages with the end of the neck of the fuel tank, the inner cap 202 is prevented from further rotation. This in turn prevents further rotation of the clutch 204. However as the operator continues to exert a rotational force on the outer cap 206, the ridges 232 are caused to ride over the pegs 228, the movement of the pegs 228 being allowed by the resilient arms 226 upon which they are mounted. In this way the operator can rotate the outer cap whilst the inner cap remains stationary thus preventing the operator from over-tightening the fuel cap onto the neck of the fuel tank.

The air filtration mechanism for the carburetor 126 will now be described.

The two stroke engine comprises a carburetor 126 which mixes liquid fuel with air to generate a combustible mixture for powering the engine. However, due to the operation of the power cutter, a large amount of dust is generated which mixes with the surrounding air. This results in dust laden air. In order to ensure that the air entering the carburetor is free from dust it must pass through a filter system to remove the dust.

The filter system will now be described with reference to FIGS. 23 to 29.

Inside the body 2 is a filter unit 316 comprising a plastic base 318 and filter paper 320 folded to form pleats. The filter unit 316 is located within the body 2 so that the pleats 320 hang vertically downwards when the power cutter is located in its standard orientation ie when it is located on a horizontal surface as shown in FIG. 1.

Air will be sucked through the filter system by the carburetor 126. Air enters slots 314 on the rear of the body 2. Air passes (Arrow G) to a space 322 underneath the filter unit 316 and then passes through the filter paper 320 to a space 324 above the filter unit 316. Any dust entrained within the air is trapped by the filter unit 316 and held within the pleats of the filter paper 320.

The clean air then passes from the space 324, through a hose 326 to the carburetor 126 located below the space 322 below the filter unit 316.

In order to enable the operator to remove the dust trapped within the pleats of the filter paper 320, a cleaning device is provided. The cleaning device comprises a rubber flap 328, mounted on the top of a plastic base 330, a brush 332 attached to the bottom of the plastic base 330, a handle 334 attached to the plastic base 330 via to rigid arms 338. The base 330 can slide within the space 322 below the filter unit 316, widthways across the body 2. Movement is caused by the operator pulling the handle 334 away from the side of the body 2. Two springs 336 bias the handle 334 towards the side of the body 2.

In order to clean the filter unit, the operator pulls the handle 334, to move the base 330 across the width of the body 2 in the direction of Arrow H, and then releases it to allow it to return in the opposite direction under the biasing force of the springs 336.

Figure 25:
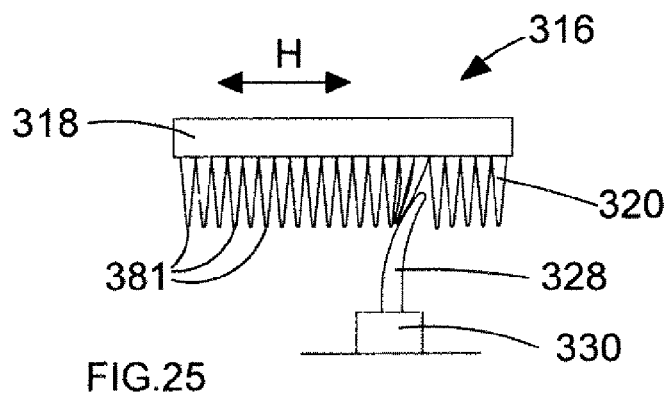
FIGS. 25 and 26 show sketches of the cleaning action of the filter.

As the base 330 slides across the width, the rubber flap 328 engage with the pleats 320, causing the pleats to flex, as best seen in FIG. 25, knocking the dust of the pleats 320. The dust drops to the base 340 of the space 322 below the filter unit 316.

The brush 332 slidingly engages with the base 340 of the space 322. The brush 332 brushes the dust to one side or the other, depending on the direction of movement. An aperture 344 is formed on one side of the body 2. As the brush approaches the side of the body, it pushes the dust being swept along the base through the apertures, expelling it from the body 2.

Figure 26:
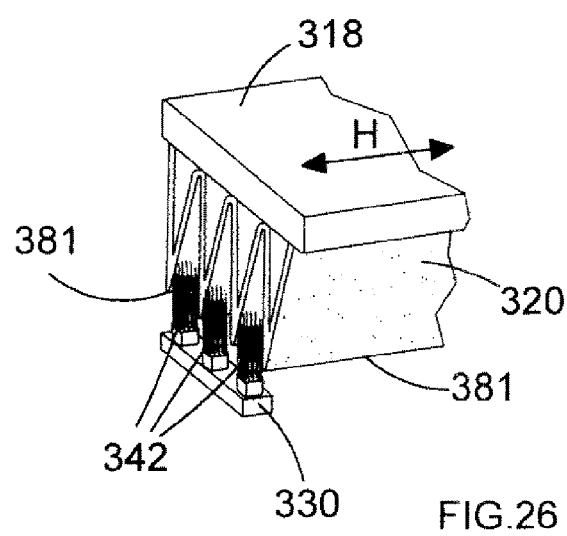
Figure 24:
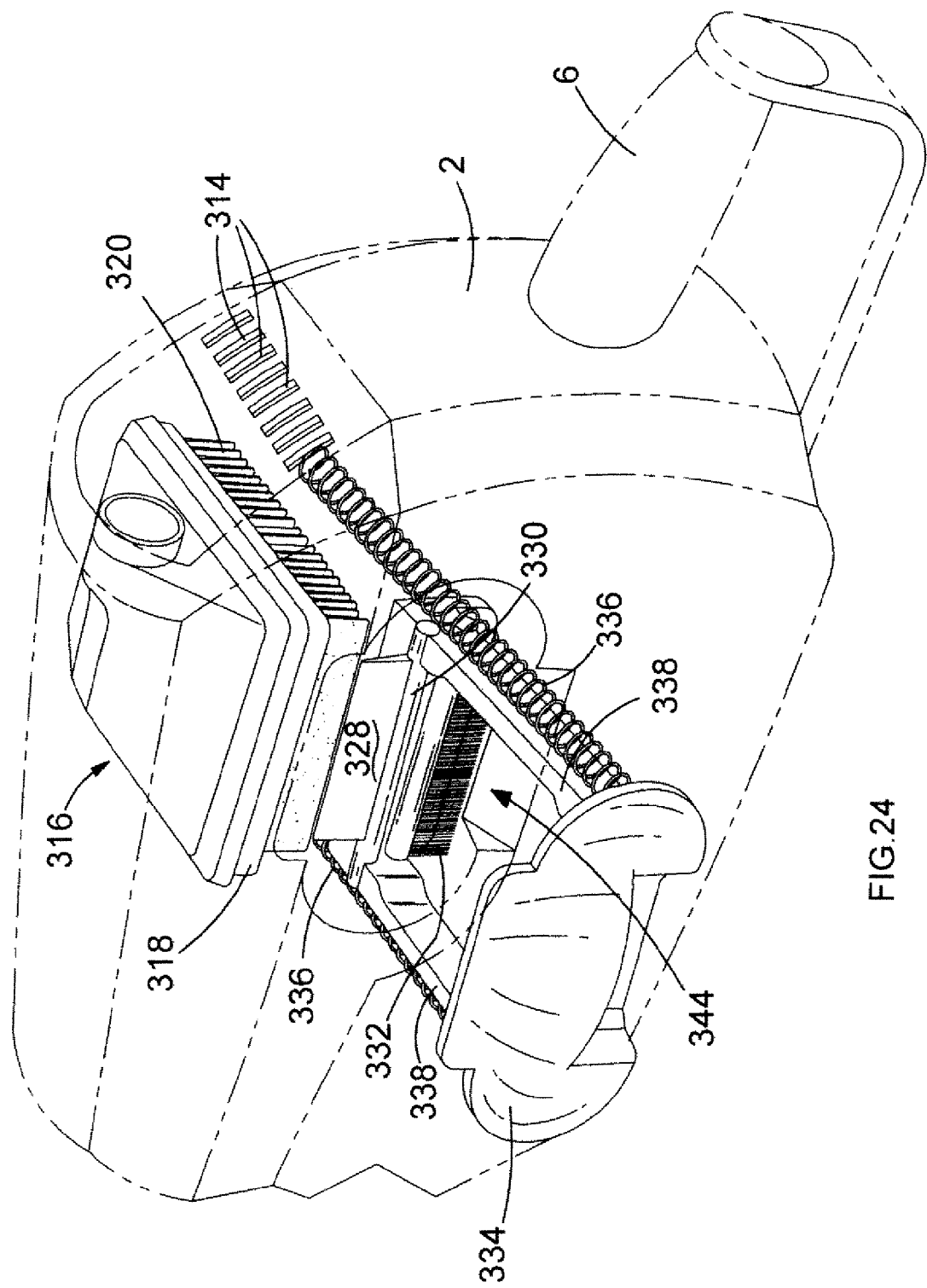
FIG. 24 shows a computer generated drawing of the filter.
Figure 27:
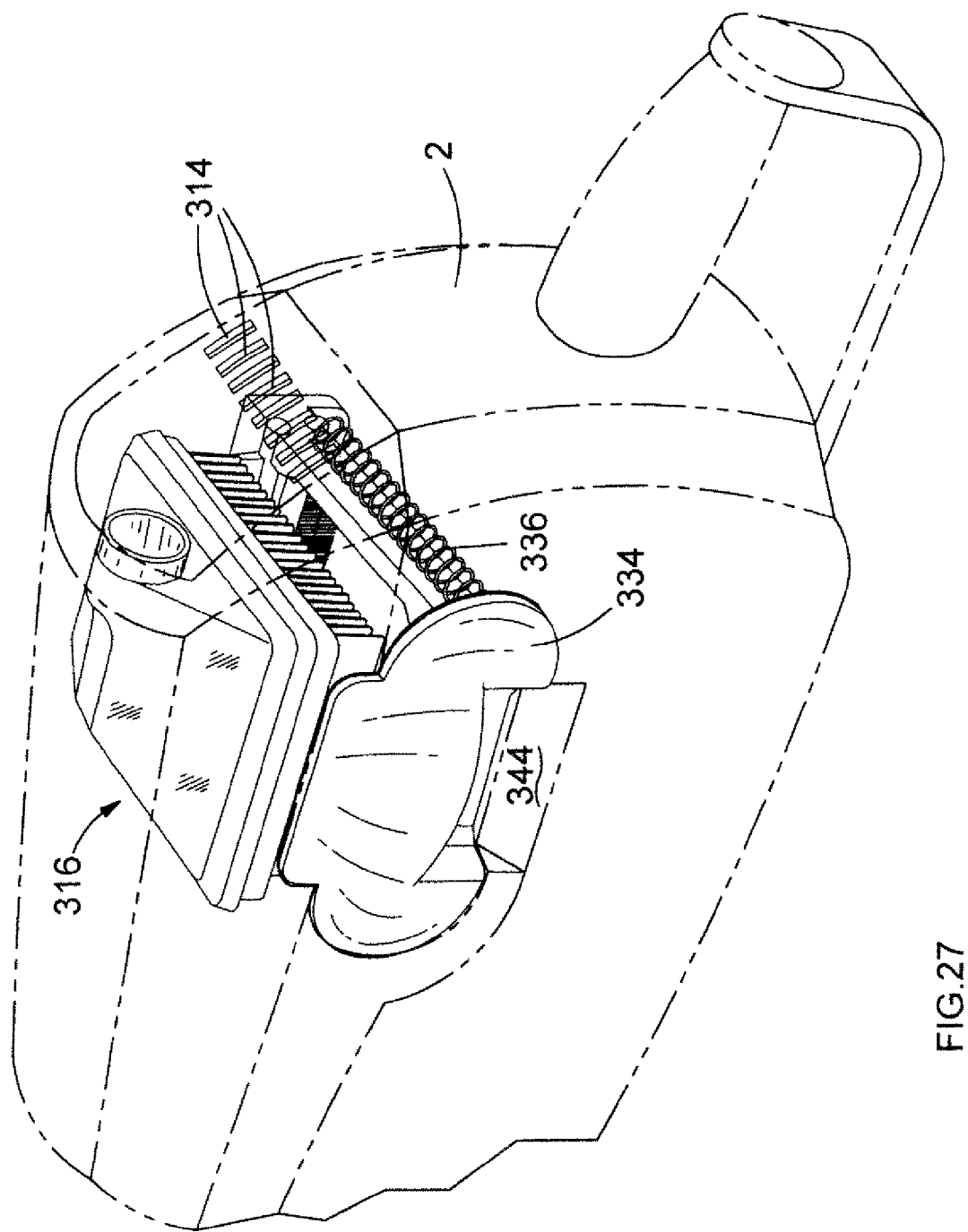
FIGS. 27 to 29 show more computer generated drawings of the filter.
Figure 28:
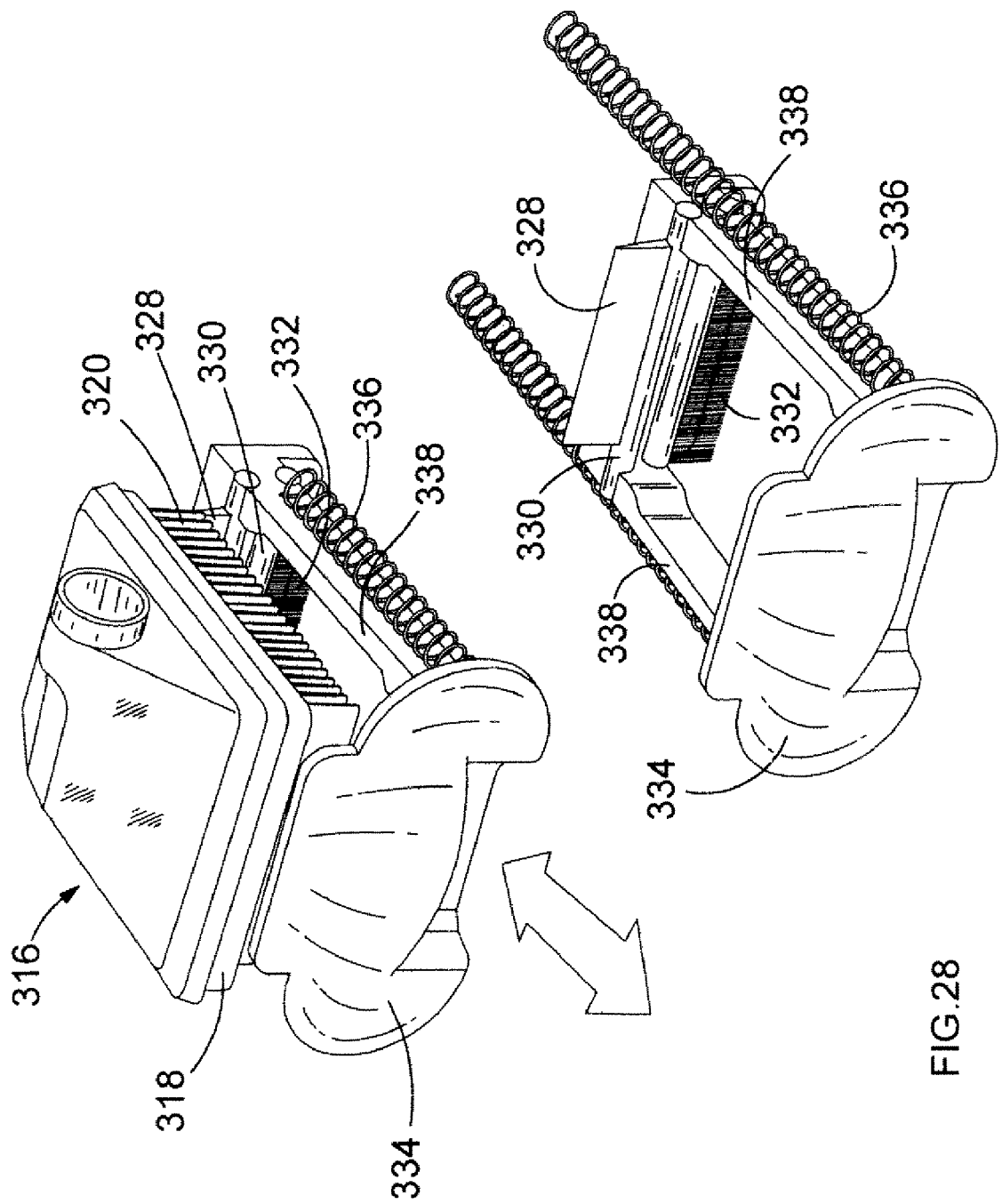
Figure 29:
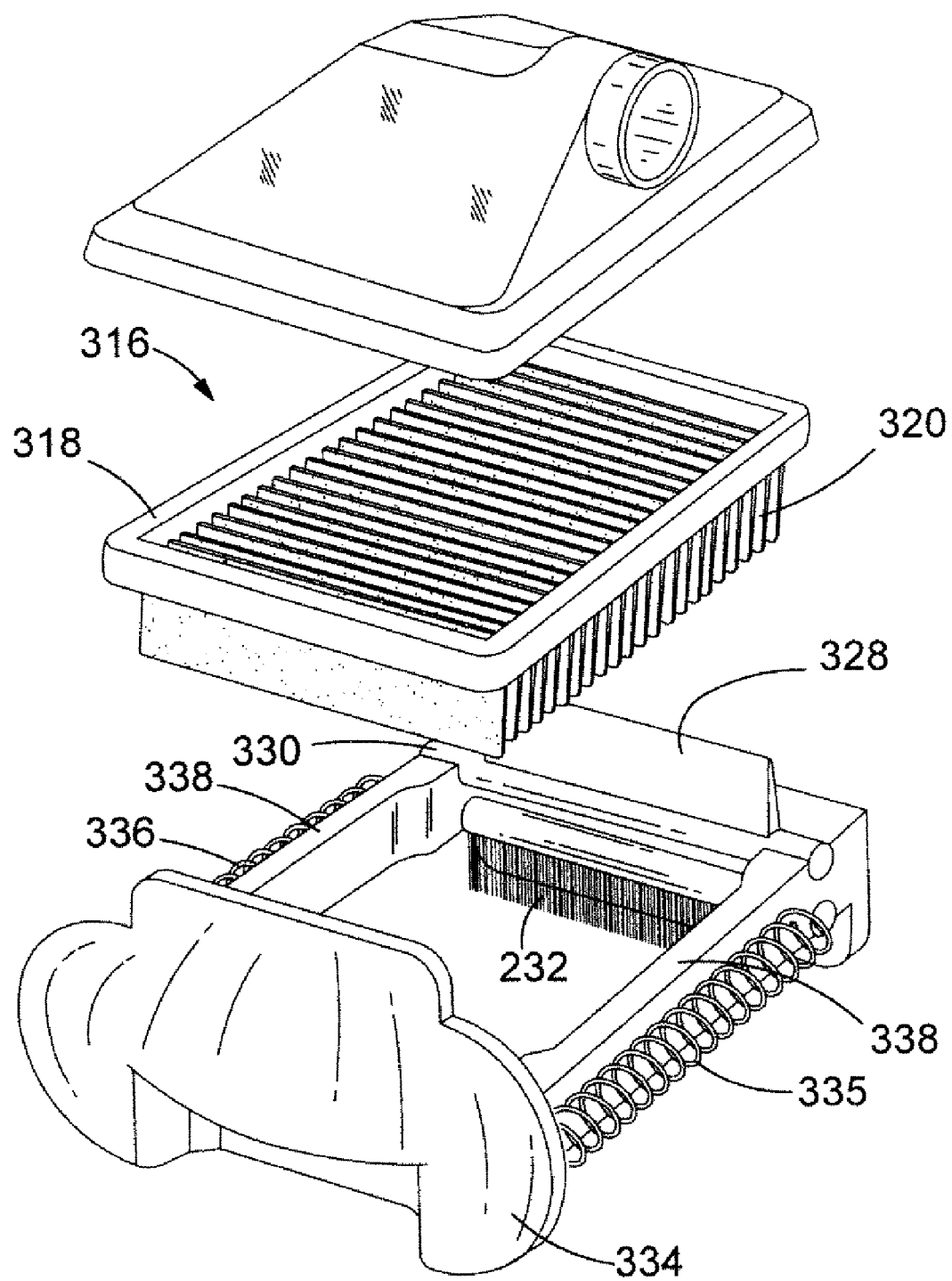

Though FIG. 25 shows the flap 328 moving perpendicularly to the direction of the pleats 320, it will be appreciated by a person skilled in the art that is possible to rotate the filter paper 320 so that the pleats run in parallel to the sliding movement of the flap 328 as shown in FIG. 26. In such a scenario, the rubber flap 28 may be replaced by a plurality of brushes 342. In FIGS. 25 and 26, the lower edges of the pleats are indicated by reference number 381

The construction of the rear handle will now be described with reference to FIGS. 1 and 2.

The body of the power cutter is constructed in the form of a plastic casing constructed from a number of plastic clamshell rigidly connected together. The rear clam shell 430 connects to the rear handle 6. In existing designs of power cutter, the rear handle 6 is integral with the rear clam shell 430. However, if the handle 6 is broken, the whole clam shell 430 needs to be replaced. As handle breakage is common it is desirable to avoid this.

Therefore, the rear handle 6 in the present invention is constructed as a separate item to that of the rear clam shell 430 (or body 2).

The rear handle 6 is constructed from a separate single clam shell 431 which is joined at its top 432 at two points 434 and at its bottom at a single point 436. Each of the three points 434, 436 is joined using a bolt which screws into the plastic clam shell 430. Vibration dampening material may be used in conjunction with the bolts to reduce the amount of vibration transferred to the handle 6 from the body 2. The use of such vibration dampening material allows limited movement of the handle 6 relative to the rear clam 430 at each of the three points. The movement could be either linear or rotational. One such construction is to surround the bolts with the dampening material in order to sandwich it between the bolts and parts of the clam shell of the rear handle 6.

The top 432 of the handle 6 is in the form of a cross bar. The shape is such that the bolts fastening the top 432 of the handle to the rear of the clam shell 430 are aligned with each other and thus provide a pivot axis 440 for the rear handle 6 about which it can rotate by a limited amount.

A person skilled in the art will appreciate that the handle may be constructed from a number of clam shell connect rigidly together. Rubber soft grip over mold 442 may also be added to the handle for additional comfort.

Figure 30:
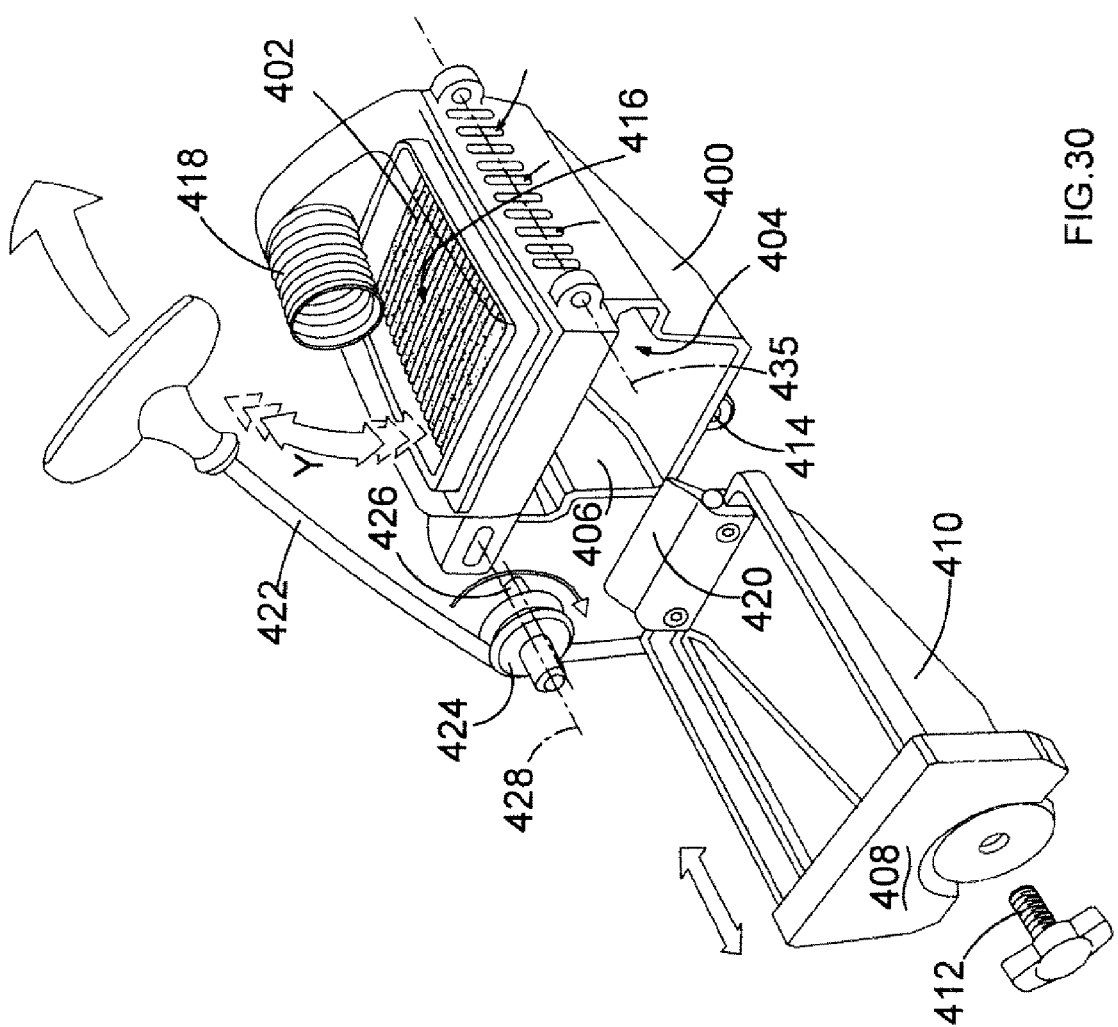
FIG. 30 shows a second embodiment of an air filtration system.

A second embodiment of an air filtration system will now be described with reference to FIG. 30.

The filter device comprises a box 400 in which is mounted filter paper 402 which is pleated and which hangs down from the top section from inside the box. A space 404 is formed below the pleat. A large aperture 406 is formed in the side of the box below the filter paper and through which a drawer 408 can be slid. The drawer comprises a receptacle 410 which locates in the space 404 immediately below the filter paper 402. The drawer 408 can be fastened into place via a screw 412 which threadedly engages a threaded hole 414 in the box. Air passes through slots 314 into the box and into the receptacle 410 in the space 404 below the filter paper 402 then through the filter paper 402 into a space 416 above the filter paper 402 and then exits the space 416 above the filter paper through a flexible tube 418 to the carburetor 126. Any dust contained in the air entering the box 400 is blocked by the filter paper 402.

A combination of two systems have been proposed to shake any dust within the filter paper 402 off the filter paper 402 into the drawer 408 of the receptacle 410 so that the drawer 408 can be removed for emptying.

The first system is very similar to that disclosed in the first embodiment described above and comprises a rubber flap 420 which is attached to the front end of the drawer 408. As the drawer 408 is inserted into the box 400 the rubber flap 420 engages with the pleated filter paper 402. As the drawer 408 slides into the box 400 the rubber flap 420 successively hits the base of each pleat causing any dust on the pleats to be knocked off and into the drawer 408. As such the action of inserting or removing the drawer 408 into the box 400 causes dust on the filter paper 402 to be loosened and allowed to be removed.

The second system relies on the starter cord 422 of the starter 12 for the two stroke engine 24 of the power saw. When the engine is started, the power cord 422 needs to be pulled in order to cause it to rotate. As the cord 422 is pulled, it rotates a pulley wheel 424 which causes an eccentric pin 426 to rotate about the axis 428 of the pulley 420. This causes one side of the box 400 to oscillate up and down as indicated by arrows Y. The other side of the box 400 is pivotally attached about an axis 435 to the body of the power cutter. The reciprocating motion of the box 400 causes dust in the filter 402 to be shaken off the filter paper 402 and into the drawer 408.

Each system cause dust trapped in the filter paper 402 to fall into the drawer. When the operator first starts up the power cutter, the action of pulling the starter cord cleans the filter paper 402. Then, the operator can subsequently clean the filter paper during the operation of the power cutter by inserting and removing the drawing 408.

It will be appreciated by a person skilled in the art that the two systems could be used separately, as well as in combination, a power cutter having only one or the other system. If will be further appreciated that the eccentric pin 426 could be replaced by a cam mechanism.

The invention claimed is:

1. A power cutter comprising:
a housing;
a support arm connected to the housing;
a blade mounting mechanism rotatably mounted on an end of the support arm opposite the housing;
an engine mounted within the housing that rotates the blade mounting mechanism on the support arm;
a liquid fuel aeration mechanism;
an air intake member connected to the engine that delivers aerated fuel from the liquid fuel aeration mechanism;
a fuel tank for providing fuel to the liquid fuel aeration mechanism;
an exhaust member through which exhaust gases generated by the engine are expelled;
an air filtration mechanism including a mechanism housing containing an air filter member, the mechanism housing is operable to direct air through the air filter member and into the air intake member;
the air filter member having a plurality of pleats, the plurality of pleats defining an axis aligned with a long dimension of each of the pleats that is disposed generally vertically when the power cutter is in a standard operational orientation,
wherein the air filtration mechanism includes a moveable frame having a handle, the moveable frame is connected to a moveable pleat stroker and is movable relative to the mechanism housing, the handle having a portion that is accessible from an exterior of the housing of the power cutter, the portion of the handle is configured to be grasped by an operator and when moved by the operator causes the movement of the pleat stroker relative to the air filter member.

2. The power cutter of claim 1, wherein the axis aligned with the long dimension of each of the pleats is disposed in a direction that is generally in line with the air leaving the air filter member but transverse to a direction of the air where the air enters the engine.

3. The power cutter of claim 1, wherein the liquid fuel aeration mechanism includes a carburetor that provides the aerated fuel to the engine, the aerated fuel includes lubricating oil for the engine, the air filter member is disposed above where the carburetor is disposed in the housing of the power cutter when the power cutter is in the standard operational orientation, the carburetor being on the opposite side of the engine from the support arm.

4. The power cutter of claim 1, wherein the mechanism housing of the air filtration mechanism is operable to draw air with dust to a space defined by the mechanism housing that is disposed below where the air filter member is contained in the mechanism housing, the air then passes through the air filter member to remove the dust and to arrive in a space defined by the mechanism housing that is above where the air filter member is contained prior to the air being directed toward the liquid fuel aeration mechanism when the power cutter is in the standard operational position.

5. The power cutter of claim 4, wherein the moveable pleat stroker is disposed below where the air filter member is contained in the mechanism housing when the power cutter is in the standard operational position, the moveable pleat stroker is operable to engage at least one of a first pleat and a second pleat of the plurality of pleats and cause at least one of the first pleat and the second pleat to flex and release the dust trapped on at least one of the first pleat and the second pleat to permit the dust to fall into the space defined by the mechanism housing below the where air filter member is contained.

6. The power cutter of claim 5, wherein the pleat stroker includes a brush that is operable to move along a path disposed between and generally parallel to a lower edge of the first pleat and a lower edge of the second pleat.

7. The power cutter of claim 5, wherein the pleat stroker includes a flexible flap that is operable to move along a path that traverses a lower edge of the first pleat and a lower edge of the second pleat.

8. The power cutter of claim 5, wherein said pleat stroker includes a brush that is connected to the moveable frame, the brush is operable to knock the dust off of at least the first pleat and the second pleat, the housing of the power cutter defines an aperture through which the brush is operable to direct the dust from the space below where the air filter member is contained in the mechanism housing to a location outside of the housing of the power cutter.

9. The power cutter of claim 8, wherein the handle that is capable of being grasped by the operator is operable to seal the aperture when the moveable frame is in a first position, the handle having a portion operable to expose the aperture and permit and the brush to direct the dust through the aperture when the handle is moved from the first position.

10. The power cutter of claim 9, wherein the moveable frame includes a spring member that is operable to maintain the moveable member in the first position that seals the aperture defined on the housing of the power cutter, when the handle is moved from the first position, the portion of the handle is operable to unseal the aperture on the housing when the moveable frame is moved against the spring member and out of the first position.

11. The power cutter of claim 5 further comprising: a tray that is removably coupled to the moveable frame and disposed underneath where the pleat stroker is disposed to catch the dust that falls from the plurality of pleats of the air filter member, the tray being removable from the housing of the power cutter to dispose of the dust.

12. The power cutter of claim 1 further comprising: a vibration device is operable to shake the air filter member when starting the engine with a starter cord.

13. The power cutter of claim 12, wherein the vibration device includes an eccentric cam mechanism connected to the air filter member, the vibration device is operable to vibrate the air filter member when the eccentric cam mechanism rotates due to the starting of the engine with the starter cord.

14. A power cutter comprising:
a housing;
a support arm connected to the housing;
a blade mounting mechanism rotatably mounted on an end of the support arm opposite the housing;
an engine mounted within the housing that rotates the blade mounting mechanism on the support arm;
a liquid fuel aeration mechanism;
an air intake member connected to the engine that delivers aerated fuel from the liquid fuel aeration mechanism, the liquid fuel aeration mechanism being connected on the opposite side of the engine from the support arm; an exhaust member through which exhaust gases generated by the engine are expelled;
an air filtration mechanism including a mechanism housing;
an air filter member including a plurality of pleats, said air filter member contained in the mechanism housing;
the plurality of pleats defining an axis aligned with a long dimension of each of the pleats that is disposed generally vertically when the power cutter is in a standard operational orientation, the long dimension of each of the pleats is generally in line with the air leaving the air filter member but transverse to a direction of the air entering the engine;
the mechanism housing defining a space that is disposed below where the air filter member is contained in the mechanism housing but above where the liquid fuel aeration mechanism is disposed in the housing of the power cutter, the mechanism housing is operable to draw the air with dust to the space from outside the housing of the power cutter and then pass the air with dust through the air filter member to remove the dust;
the mechanism housing defining a space that is disposed above where the air filter member is contained in the mechanism housing; the mechanism housing operable to direct the air from the air filter member to the space above where the air filter member is contained in the mechanism housing and toward the liquid fuel aeration mechanism that is disposed beneath where the air filter member is contained when the power cutter is in the standard operational orientation.

15. The power cutter of claim 14 further comprising: an air filter cleaning mechanism including a moveable pleat stroker located below where the air filter member is contained in the mechanism housing, the moveable pleat stroker is operable to engage at least a first pleat of the plurality of pleats and cause the first pleat to flex and release the dust trapped thereon and to permit the dust to fall into the space defined by the mechanism housing below where the air filter member is contained.

16. The power cutter of claim 15, wherein the pleat stroker includes a brush that is operable to move along a path disposed between and generally parallel to a lower edge of the first pleat and a lower edge of a second pleat.

17. The power cutter of claim 15, wherein the pleat stroker includes at least a flexible flap that moves along a path that traverses a lower edge of the first pleat and a lower edge of a second pleat.

18. The power cutter of claim 17, wherein the air filtration mechanism includes a moveable frame having a handle, the moveable frame is connected to the pleat stroker and is movable relative to the mechanism housing, the handle having a portion that is accessible from an exterior of the housing of the power cutter, the portion of the handle is operable to be grasped by an operator and when moved by the operator causes the movement of the pleat stroker relative to the air filter member.

19. The power cutter of claim 18, wherein said pleat stroker includes a brush that is connected to the moveable frame, the brush is operable to knock the dust off of at least the first pleat, the housing of the power cutter defines an aperture through which the brush directs the dust from the space defined by the mechanism housing below where the air filter member is contained in the mechanism housing to a location outside of the power cutter housing, the handle is operable to seal the aperture when the moveable frame is in a first position, the handle having a portion operable to expose the aperture to permit and the brush to direct the dust through the aperture when the handle is moved from the first position, the moveable frame having a spring member that is operable to maintain the movable frame in the first position so that the handle is operable to seal the aperture defined on the housing and when the handle is moved from the first position, the portion of the handle is operable to unseal the aperture on the housing when the moveable frame is moved against the spring member and out of the first position.

20. The power cutter of claim 14 further comprising: a vibration device that is operable to shake the air filter member when starting the engine with a starter cord.

21. The power cutter of claim 20, wherein the vibration device includes an eccentric cam mechanism connected to the air filter member, the vibration device is operable to vibrate the air filter member when the eccentric cam mechanism rotates due to the starting of the engine with the starter cord.

22. A method for directing an airflow with clean air to an engine that operates a power cutter in an environment that includes air laden with dust, the method comprising:

providing a liquid fuel aeration mechanism connected to the engine;

providing an air filtration mechanism having a mechanism housing;

disposing an air filter member having a plurality of pleats in the mechanism housing to filter the airflow, the plurality of pleats having an axis aligned with a long dimension of each of the pleats;

positioning the air filter member in said mechanism housing so the long dimension of each of the pleats is disposed generally vertically when the power cutter is in a standard operational orientation, the long dimension of each of the pleats is generally in line with the airflow with the air laden with dust entering the air filter member through the mechanism housing, but the long dimension of each of the pleats is generally transverse to a direction of the airflow with the clean air that is entering the engine, directing the airflow with the air laden with dust to a space defined by the mechanism housing that is disposed below where the air filter member is disposed in the mechanism housing but above where the liquid fuel aeration mechanism is connected to the engine;

directing the airflow with the air laden with dust through the air filter member to remove the dust and produce the airflow with the clean air; directing airflow with the clean air from the air filter member to a space defined by the mechanism housing that is above where the air filter member is disposed in the mechanism housing, directing the airflow including the clean air from the space where the air filter member is contained in the mechanism housing toward the liquid fuel aeration mechanism that is disposed beneath where the air filter member is disposed in the mechanism housing when the power cutter is in the standard operational orientation.

23. The method of claim 22 further comprising: disengaging the dust from the plurality of pleats of the air filter member; collecting the dust in the space defined by the mechanism housing below where the air filter member is disposed in the mechanism housing.

24. The method of claim 22 further comprising:

providing a handle having a portion that is accessible from an exterior of a housing of the power cutter; and moving a pleat stroker relative to the air filter member by moving the portion of the handle.

* * * * *